United States Patent

Mohr et al.

[11] 4,082,740
[45] Apr. 4, 1978

[54] QUATERNARY BASIC AZODYESTUFFS CONTAINING A PROPENYL AMINO RADICAL

[75] Inventors: Reinhard Mohr, Offenbach am Main; Eberhard Mundlos, Heusenstamm; Kurt Hohmann, Neu-Isenburg, all of Germany

[73] Assignee: Hoechst Aktiengesellschaft, Frankfurt am Main, Germany

[21] Appl. No.: 741,661

[22] Filed: Nov. 15, 1976

Related U.S. Application Data

[63] Continuation of Ser. No. 642,671, Dec. 19, 1975, abandoned.

[30] Foreign Application Priority Data

May 17, 1975 Germany ............................ 2522174

[51] Int. Cl.$^2$ ............... C09B 29/00; C09B 45/12; D06P 1/08; D06P 1/10
[52] U.S. Cl. ....................... 260/146 R; 260/146 D; 260/146 T; 260/147; 260/149; 260/152; 260/153; 260/154; 260/155; 260/156; 260/157; 260/158; 260/162; 260/163; 260/164; 260/165; 260/205; 260/207.1
[58] Field of Search ............... 260/157, 152, 153, 154, 260/155, 156, 158, 162, 163, 164, 146 D, 146 T, 146 R, 165

[56] References Cited

U.S. PATENT DOCUMENTS

| | | | |
|---|---|---|---|
| 3,098,063 | 7/1963 | Eisele et al. | 260/163 |
| 3,208,992 | 9/1965 | Bowman et al. | 260/162 |
| 3,316,239 | 4/1967 | Riat et al. | 260/163 |
| 3,417,074 | 12/1968 | Kuhne et al. | 260/151 |
| 3,892,725 | 7/1975 | Stiot et al. | 260/157 |
| 3,932,377 | 1/1976 | Merlo et al. | 260/158 |

Primary Examiner—Floyd D. Higel
Attorney, Agent, or Firm—Connolly and Hutz

[57] ABSTRACT

New basic azo dyestuffs of the formula

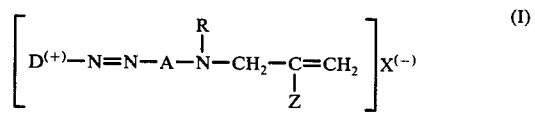

where
- $D^{(+)}$ is the radical of an aromatic or heterocyclic diazo component containing a quaternary nitrogen atom,
- A is an aromatic radical or, together with the -(NR)- member of the formula, forms a heterocyclic radical,
- R is hydrogen, optionally substituted lower alkyl, aralkyl or cycloalkyl,
- $X^{(-)}$ is an anion, and
- Z is hydrogen or methyl, had been found which are suitable for dyeing and forming, for example, tannin-treated cellulose fibers, silk, leather, acetate silk, acid modified polyamide or polyester fibers and for dyeing and printing and spin-dyeing of polyacrylonitrile or polyvinylidene cyanide containing fibers. The dyeings and prints obtained are generally are of high tinctorial strength and brilliant and have very good fastnesses.

10 Claims, No Drawings

QUATERNARY BASIC AZODYESTUFFS CONTAINING A PROPENYL AMINO RADICAL

This application is a continuation of application Ser. No. 642,671 filed Dec. 19, 1975 and now abandoned.

Novel dyestuffs have been found which are free from sulfonic acid groups and have the formula (I)

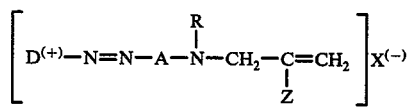

where
- $D^{(+)}$ is the radical of an aromatic or heterocyclic diazo component containing a quaternary nitrogen atom,
- A is an aromatic radical or, together with the -(NR)- member of the formula, forms a heterocyclic radical,
- R is hydrogen, optionally substituted lower alkyl, aralkyl or cycloalkyl,
- $X^{(-)}$ is an anion, and
- Z is hydrogen or methyl.

The novel dyestuffs are obtained by
(a) coupling the diazonium compound of a quaternary amine of the formula (II)

where
$D^{(+)}$ and $X^{(-)}$ are as defined above, with a coupling component of the formula (III)

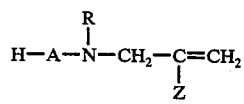

where
A, Z and R are ad defined above; or by
(b) treating an azo dyestuff of the formula (IV)

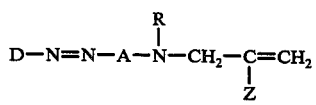

where
D is the radical of a diazo component and A, Z and R are as defined above, with alkylating agents. The quaternary amines of formula (II) used for the process according to a) may be obtained by treatment of suitable aromatic or heterocyclic amines with alkylating agents, for example alkyl halides, aralkyl halides, halogeno-acetamides, β-halogeno-propionitriles, halogeno-hydrines, alkylene oxides, acrylic acid amide, alkyl esters of sulfuric acid or of organic sulfonic acids.

Suitable quaternary amines of formula (II) are for example those of the formula (V)

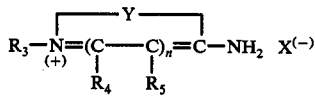

where
- $R_3$ is optionally substituted alkyl or aralkyl,
- Y is a bivalent atom or a bivalent group required for closing a 5- or 6-membered ring,
- $R_4$ and $R_5$ are identical or different and represent each hydrogen or alkyl, or they are together substituents closing a fused aromatic ring,
- n is 0 or 1 and
- $X^{(-)}$ is an anion.

Such quaternary compounds may be derived from amines of the pyridine, pyrazole, imidazole, triazole, tetrazole, oxazole, thiazole, selenazole, oxadiazole, thiadiazole, pyrimidine or triazine series, furthermore from the quinoline, indazole, benzimidazole, benzo-isothiazole, arylguanazole, naphthimidazole, benzoxazole, naphthoxazole, benzothiazole or naphthothiazole series.

Suitable quaternary amines are furthermore those of the formulae (IV) and (VII)

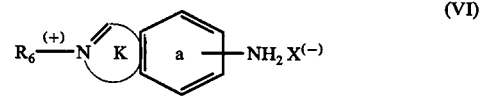

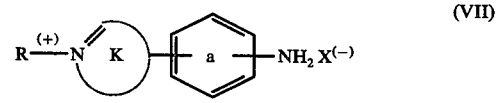

where
- $R_6$ is optionally substituted alkyl or aralkyl,
- K is a 5- or 6-membered heterocyclic ring, for example a pyridinium, triazolium, pyrazolium or thiazolium radical,
- $X^{(-)}$ is an anion and the benzene radical a may contain further substituents such as halogen, alkoxy, aryloxy, alkyl, trifluoromethyl, nitro, alkylsulfonyl, arylsulfonyl, cyano or acyl.

Suitable amines are furthermore those of the formulae (VIII) and (IX)

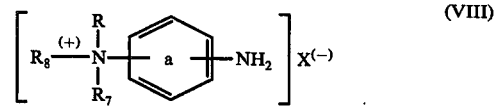

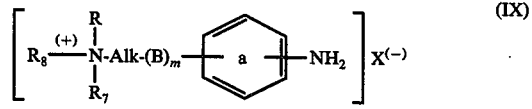

where
- $R_7$, $R_8$ and R each are optionally substituted lower alkyl,
- Alk is straight-chain or branched lower alkylene,
- B is $-O-$, $-S-$, $-CO-$, $-SO_2-$, $-CONH-$, $-OCO-$ or $-SO_2NH-$,
- M is 0 or 1,
- $X^{(-)}$ is an anion, and the benzene radical a may contain further substituents of the kind as indicated above for formula (VII).

Suitable coupling components of formula (III) are secondary or tertiary amines of the benzene or naphthalene series, where R is hydrogen or methyl, ethyl, propyl or butyl, optionally containing further substituents such as halogen, hydroxy, cyano, acyloxy, carbalkoxy, carbamoyl, dialkylamino, alkoxy, trifluoromethyl, acyl, carbamic acid ester, alkylsulfonyl, sulfamoyl or aryloxy groups. R may furthermore be cycloalkyl, for example cyclohexyl, aralkyl, for example benzyl or phenethyl, or aryl, for example optionally substituted phenyl.

Together with the -(NR)- formula member, A may also represent 1,6-(1,2,3,4-tetrahydro)-quinolinylene or -7,8-benzoquinolinylene, 1,6-benzomorpholinylene, or 1,3-inodlinylene. The radical R may furthermore contain substituents, for example halogen, alkyl, alkoxy, carbalkoxy, alkylsulfonyl, carbamoyl, sulfamyl, amino, trifluoromethyl, acyl or acylamino groups.

The amines of formula (II) are diazotized according to known methods, for example by means of alkyl nitrite or an alkali metal nitrite, as sodium nitrite, and an inorganic acid, for example hydrochloric, sulfuric or phosphoric acid, or by means of nitrosylsulfuric acid.

Coupling with the coupling components of formula (III) is also carried out in known manner, for example in a neutral or acidic medium, optionally in the presence of sodium acetate or other known buffer substances or catalysts influencing the coupling speed, for example dimethyl formamide, pyridine or the salts thereof.

The starting dyestuffs of formula IV used for the process according to (b) are obtained by coupling the diazotized amines of the formula D—NH$_2$ with the coupling components, or by condensation of the amines with the corresponding p-nitroso compounds of formula (III).

The process according to (b) es especially suitable in the case of amines of the formula (X)

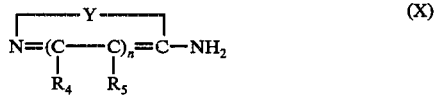

(X)

where $n$, Y, R$_4$ and R$_5$ are as defined for formula (V). Suitable amines of formula (X) are above all those of the pyridine, pyrazole, imidazole, triazole, tetrazole, oxazole, thiazole, selenazole, oxadiazole, thiadiazole, pyrimidine or triazine series, furthermore of the quinoline, indazole, benzimidazole, benzoisothiazole, arylguanazole, naphthimidazole, benzoxazole, benzothiazole or naphthothiazole series.

Suitable alkylating agents are alkyl halides, aralkyl halides, halogeno-acetamides, β-halogeno-propionitriles, halogeno-hydrines, alkylene oxides, acrylic acid amide, alkyl esters or sulfuric acid or alkyl esters of organic sulfonic acids, for example methyl chloride, bromide or iodide, ethyl bromide or iodide, propyl bromide or iodide, benzyl chloride chloro-acetamide, β-chloropropionitrile, ethylene-chlorohydrine, dimethyl sulfate, benzenesulfonic acid methyl ester, p-toluenesulfonic acid methyl, ethyl, propyl or butyl ester. Advantageously, the alkylation is carried out in an inert organic solvent, for example a hydrocarbon, a chlorinated or nitrated hydrocarbon, such as benzene, toluene, xylene, tetrachloroethane, chloroform, carbon tetrachloride, mono- or dichlorobenzene or nitrobenzene, in an acid amide or anhydride such as dimethyl formamide, N-methylacetamide or acetic acid anhydride, in dimethyl sulfoxide or a ketone such as acetone or methylethylketone. Instead of an organic solvent, the alkylating agent may also be used in excess.

Depending on the number of nitrogen atoms capable of being alkylated in the starting dyestuff one or more alkyl groups are introduced into the dyestuff molecule. Alkylation is carried out at elevated temperature, optionally with addition of acid-binding agents, such as magnesium oxide, magnesium carbonate, sodium carbonate, calcium carbonate or sodium bicarbonate, and optionally under pressure. The most favorable conditions for each case may be easily determined by a preliminary test.

In certain cases, the alkylation may also be carried out in water.

In a modification of the above process, the novel dyestuffs may also be obtained by coupling a hydrazone or benzylsulfonylhydrazone of the formula (XI)

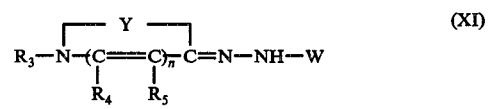

(XI)

where

Y, R$_3$, R$_4$, R$_5$ and $n$ are as defined for formula (V), and W is hydrogen or benzenesulfonyl, with a coupling component of formula (III) in the presence of oxidation agents.

As anion X$^{(-)}$, the novel dyestuffs contain preferably the radical of a strong acid, for example of sulfuric acid or its semi-esters, of arylsulfonic or a hydrohalic acid. These anions introduced according to the process of the invention may be replaced by anions of other acids, for example phosphoric, acetic, oxalic, lactic or tartaric acid. The dyestuffs may be obtained furthermore in the form of their double salts with zinc or cadmium halides.

Among the novel dyestuffs of the invention, compounds of the formula (XII)

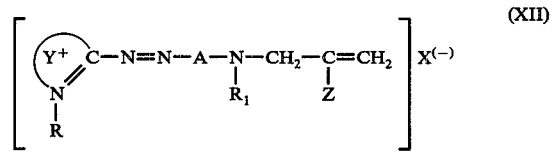

(XII)

are very interesting, where

Z is as defined above,

Y together with

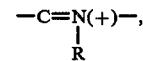

is thiazolyl, benzothiazolyl, pyrazolyl, indazolyl, triazolyl, quanazolyl, quinolyl or pyridyl, A is phenylene or phenylene substituted by chlorine, methyl, ethyl, methoxy, ethoxy groups, carboxylic acid alkyl ester groups having from 2 to 5 carbon atoms, or acetylamino groups; the radicals R and R$_1$ are identical or different and each represent hydrogen, alkyl having from 1 to 4 carbon atoms, β-cyanoethyl, β-hydroxyethyl, β-chloroethyl, β-chloro-γ-hydroxypropyl, β-acetoxyethyl or benzyl, and X$^{(-)}$ is an anion.

Especially interesting are dyestuffs of the following formula

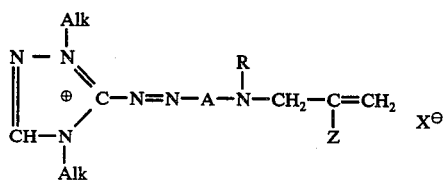

where

Alk is methyl or ethyl,

A is p-phenylene optionally substituted by chlorine, methyl, methoxy, acetylamino or carbomethoxy, R is hydrogen or lower alkyl having from 1 to 4 carbon atoms, β-cyanoethyl, β-chloroethyl, β-hydroxyethyl, β-methoxyethyl, β-carbomethoxyethyl, β-acetoxyethyl, cyclohexyl, benzyl or phenethyl, X$^{(-)}$ is an anion; and Z is as defined above.

Very suitable are also dyestuffs of the formula (XIII)

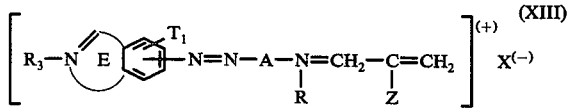

where

E is a radical which, together with R$_3$—N< and the benzene nucleus, forms imidazolinium, pyrazolinium or triazolyl, T$_1$ is hydrogen or chlorine, Z is hydrogen, bromine or methyl, R$_3$ is methyl or ethyl, and A, R, and X$^{(-)}$ are as defined for formula (XII); furthermore dyestuffs of the formula (XIV)

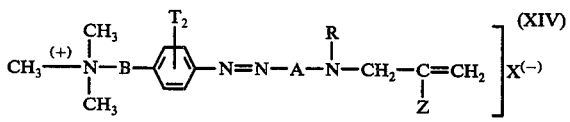

where

Z is as defined above,

B is a single bond or —(CH$_2$)$_k$—CO—, in which k is 1, 2 or 3, especially 2 or 3, T$_2$ is hydrogen, chlorine, bromine or trifluoromethyl, and A, R and X$^{(-)}$ are as defined for formula (XII).

The novel dyestuffs of the present invention are suitable for dyeing or printing tannin-treated cellulose fibers, silk, leather or synthetic fibers such as acetate silk or acid-modified polyamide or polyester fibers; but especially for dyeing, printing or spin-dyeing in the mass of polyacrylonitrile or polyvinylidene cyanide containing fibers. The dyeings obtained on these fibers are generally brilliant, very intensely colored, and they possess good to very good light and wet fastness properties, for example fastness to washing, milling, crossdyeing, carbonizing, to chlorine or to perspiration, as well as a good fastness to decating, steaming, ironing, rubbing and to solvents. Generally, the dyestuffs are substantially inert to alteration of the dyeing bath pH and may therefore be used in a weakly acidic bath. Furthermore, they are fast to temperatures above 100° C, as they are usual in high temperature dyeing. Under normal conditions, wool is completely resisted by the novel dyestuffs.

Dyeing is generally carried out in an aqueous medium at boiling temperature, or in closed vessels at a temperature above 100° C and with pressure. The dyestuffs may also be applied from organic solvents.

In order to prepare the aqueous dyeing baths or printing pastes, the dyestuffs may be used in the form of powders optionally containing extenders such as inorganic salts, dextrin or also further additives. Advantageously, concentrated aqueous solutions which are simpler to handle are used, containing from about 20 to 60% of dyestuff, one or more lower aliphatic carboxylic acids such as formic, acetic, propionic or lactic acid, and optionally further additives such as water-soluble polyhydric alcohols, the ethers or esters thereof, polyethers, aliphatic carboxylic acid amides, lactams, lactones, nitriles, dimethyl sulfoxide, diacetone alcohol, dioxan, tetrahydrofuran or urea, as well as water.

For preparing dyeing baths containing only organic solvents, for example chlorinated hydrocarbons, there are used advantageously concentrated solutions containing the dyestuff in the form of a free base or a salt of a monobasic organic acid, furthermore chlorinated hydrocarbons, organic acids or polar organic solvents.

Combined with precipitation agents such as alumina, tannin or hetero-polyacids, the novel dyestuffs form genuine pigments which may be used in paper printing.

The coupling components of formula (III) employed according to the process of the invention for preparing the novel dyestuffs are obtained for example by reaction of corresponding arylamines of the formula H—A—N(-R)—H, where A and R are as defined for formula (III), with 3-halogeno-2-methyl-propenes-(1), for example 3-chloro- or 3-bromo-2-methyl-propene-(1), or 3 halogeno-propenes-(1), for example allyl chloride or allyl bromide, in the presence of acid-binding agents, for example tertiary aliphatic or aromatic amines, magnesium oxide, magnesium carbonate, sodium carbonate or bicarbonate calcium oxide or calcium carbonate; the reaction being carried out in water or other suitable solvents, for example toluene, chlorobenzene, xylene, dimethyl formamide, dimethyl sulfoxide, glycol ethers or esters. The N-allyl-arylamines of formula (III) may also be obtained by splitting off hydrogen halide from an N-(β-halogenopropyl)-arylamine.

These and other methods of preparation suitable in analogous manner for preparing various coupling components are described for example in Bull. Soc. Chim. France 1969, p. 2337 sqq., in Chem. Ber. 1899, p. 521 and 524, id. 1900, p. 2733, in J. Org. Chem. 22, p. 1418 sqq., (1957), in Chem. Abstr. 74, 52 951 h (1971); and in U.S. Pat. No. 2,367,010.

The coupling components prepared may be separated from impurities or by-products which might be formed in the preparation process, by distillation.

The following examples illustrate the invention, parts and percentages being by weight unless otherwise stated.

EXAMPLE 1

45.4 parts of 5-chloro-7-amino-1-methylbenzimidazole are stirred with 7.5 parts of magnesium oxide in 125 parts by volume of water, and 38.8 parts by volume of dimethyl sulfate are added within about 1 hour at 50° – 60° C while stirring. Stirring is continued for about 2 hours at 50° – 60° C (pH 7.5 – 8.5), 2.5 parts of kieselguhr and 2.5 parts of active charcoal are added, the mixture is suction-filtered and washed with 120 parts by volume of hot water. 120 Parts by volume of 30% hydrochloric acid are added to the filtrate, which is then cooled to 0° C. After 75 parts of ice have been added, diazotization is carried out by adding rapidly 52 parts by volume of 5N sodium nitrite solution. After destruction of a small nitrite excess with a small amount of amidosulfonic acid, the yellow-brown, clear diazo solution is introduced into a mixture of 47.25 parts of 3-methyl-N-ethyl-N-[2-methyl-propenyl-(3)]-aniline in 500 parts by volume of water and 50 parts by volume of 5N hydrochloric acid. Stirring is continued for 2 hours, the mixture is then diluted with 750 parts by volume of water, and the dyestuff is precipitated with 125 parts of sodium chloride and 25 parts by volume of an about 64% zinc chloride solution. The dyestuff precipitated is suction-filtered, washed with a 5% sodium chloride solution and dried at 50° C. 75 Parts of dyestuff of the formula

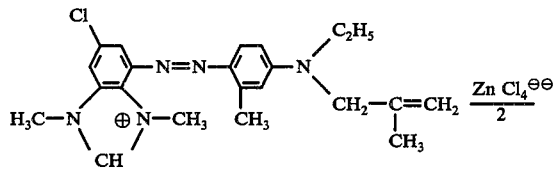

are obtained which is soluble in water, aliphatic carboxylic acids such as acetic or formic acid, optionally also in mixtures of these acids with other solvents such as alcohols, glycol-monoethers, ketones, carboxylic acid amides or esters. Its solutions have a red color, and the dyestuff dyes polyacrylonitrile fibers from a weakly acidic bath in red shades being fast to light and to wet processing.

The dyestuff may also be obtained by coupling diazotized 1-methyl-5-chloro-7-amino-benzimidazole with 3-methyl-N-ethyl-N-[2-methyl-propenyl-(3)]-aniline and subsequently quaternizing the azo dyestuff so obtained.

EXAMPLE 2

18 parts of N-methyl-benzothiazolone-2-hydrazone and 32.2 parts of N-methyl-N-[2-methyl-propenyl-(3)]-aniline are introduced into 1200 parts by volume of water and 320 parts by volume of 5N hydrochloric acid. At 40° C, a solution of 80 parts of anhydrous iron-III chloride in 400 parts by volume of water is added dropwise, and stirring is continued at 40° C until the reaction is complete (about 6 hours). Subsequently, the mixture is diluted with 4000 parts by volume of water, the solution obtained is clarified at 60° – 70° C with addition of active charcoal and kieselguhr. 200 Parts of sodium chloride and 50 parts by volume of an about 64% zinc chloride solution are added to the filtrate. The dyestuff precipitating in the form of crystals is suction-filtered, washed with a 5% sodium chloride solution and dried at 60° C. 30 parts of dyestuff of the formula

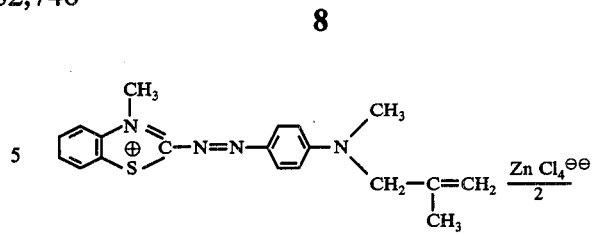

are obtained which is soluble in the substances indicated in Example 1, giving a blue color, and which dyes polyacrylonitrile fibers in blue shades being fast to light and to wet processing.

The coupling component used is obtained by heating of equimolar amounts of N-methyl-aniline and 3-chloro-2-methylpropene-(1) for several hours with or without pressure, in the presence of an acid-binding agent, for example tertiary aliphatic or aromatic amines, magnesium oxide or carbonate, sodium carbonate or bicarbonate, calcium oxide or carbonate. Optionally, this reaction may be carried out also in water or other suitable solvents such as toluene, chlorobenzene, xylene, dimethyl formamide, dimethyl sulfoxide, glycol, glycol ethers or esters.

EXAMPLE 3

11 Parts of 2-amino-thiazole are dissolved in 30 parts by volume of 95% sulfuric acid. At 0° – 5° C, diazotization is carried out with 30 parts of 42.3% nitrosylsulfuric acid, and stirring is continued for 30 minutes with nitrite excess. The diazotization mixture is poured onto 250 parts by volume of icewater and clarified with active charcoal and kieselguhr. Subsequently, 16.1 parts of N-methyl-N-[2-methyl-propenyl-(3)]-aniline are added to the diazo solution, which immediately starts the coupling. Stirring is continued for 3 hours until the coupling reaction is complete, the reaction mixture is then diluted with 2000 parts by volume of water and adjusted to pH 6–7 by means of sodium hydroxide solution. The precipitated dyestuff of the formula

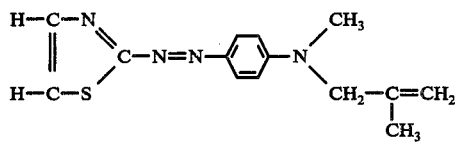

is isolated and dehydrated azeotropically with 5000 parts by volume of chlorobenzene. The solution obtained is clarified with active charcoal and kieselguhr. A catalytic amount of magnesium oxide is added to the filtrate, subsequently, at 40° C, a solution of 10 parts by volume of dimethyl sulfate in 25 parts by volume of chlorobenzene is added dropwise within 30 minutes, stirring is continued for 1 hour at 40° – 50° C, the whole is heated slowly to 80° C, and stirring is continued at 80° – 90° C until the quaternization reaction is complete (about 6 – 8 hours). The reaction mixture is cooled to 25° C, the precipitated dyestuff is isolated and dried at 50° C. 25 Parts of dyestuff of the formula

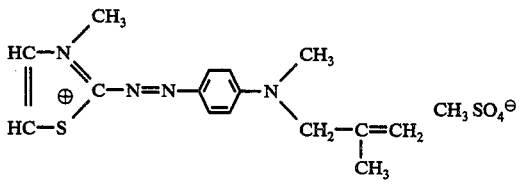

are obtained which may be further purified by redissolving in water and reprecipitation. The dyestuff is soluble in solvents as indicated in Example 1, giving a blue-violet color, and it dyes polyacrylonitrile fibers in reddish blue shades being fast to light and to wet processing. The dyestuff may be quaternized also in other organic solvents such as toluene, xylene, chloroform, acetonitrile, or in an aqueous medium.

EXAMPLE 4

A solution containing 27 parts of 4-acetaminophenacyl-trimethylammonium chloride, 50 parts by volume of water and 100 parts by volume of 5N hydrochloric acid is refluxed for 60 minutes in order to saponify the acetyl group. The solution obtained is cooled to 0° C and diazotized at 0° – 5° C with 20 parts by volume of 5N sodium nitrite solution; stirring is continued for 30 minutes with nitrite excess which is then removed with amidosulfonic acid. The diazo solution is clarified with kieselguhr, and 17.5 parts of N-ethyl-N-[2-methylpropenyl-(3)]-aniline are added with stirring, which is continued for 1 hour; the solution is diluted with 150 parts by volume of water, 50 parts of sodium chloride are added and the dyestuff is precipitated in the form of zinc chloride salt by adding dropwise 20 parts by volume of 64% zinc chloride solution. After drying at 60° C, 40 parts of dyestuff of the formula

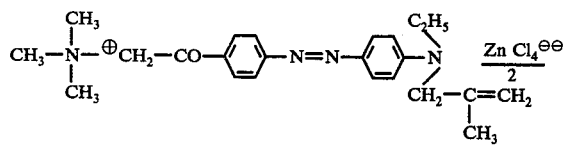

are obtained which, from a weakly acidic dyeing bath, dyes polyacrylonitrile fibers in orange shades having good light and wet fastnesses.

EXAMPLE 5

27.7 Parts of 3-amino-1,2,4-triazole are introduced into 36 parts by volume of water, and after 30 minutes, 48 parts by volume of 95% sulfuric acid are added in such a manner that the temperature does not exceed 30° C. After cooling to 0° C, diazotization is carried out at 0° – 5° C by means of 93.6 parts of 41% nitrosylsulfuric acid. While the nitrite excess is maintained, stirring is contiuned for 30 minutes. Subsequently, at 5° – 10° C, the diazotization mixture is added dropwise to a mixture of 56.7 parts of 3-methyl-N-ethyl-N-[2-methyl-propenyl-(3)]-aniline in 200 parts by volume of water of 0° C, 100 parts by volume of 5N sulfuric acid and 3 parts of amidosulfonic acid. Stirring is continued for 1 hour, the mixture is then diluted with 500 parts by volume of water having a temperature of 0° C, and part of the mineral acid is neutralized by means of 110 parts by volume of 33% sodium hydroxide solution. Subsequently, the coupling mixture is poured into a solution of 2000 parts by volume of water and 200 parts of crystallized sodium acetate, and the whole is adjusted with sodium hydroxide solution to a pH of 5 to 6. Stirring is continued for several hours, and the dyestuff of the formula

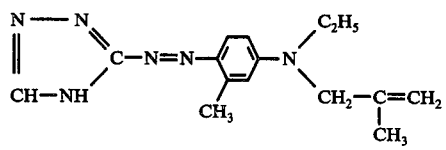

is separated from the aqueous phase.

For the quaternization, the wet dyestuff is stirred with 300 parts by volume of water and 15 parts of magnesium oxide. At 25° – 30° C, 80 parts by volume of dimethyl sulfate are added dropwise, the pH being maintained at 8 – 10. Stirring is continued for 3 hours at 30° C until the quaternization reaction is complete, which is advantageously observed by means of thin layer chromatography. The quaternization mixture is then adjusted to pH 3 by means of dilute hydrochloric acid, diluted with 2000 parts by volume of water and heated to 90° C until it is dissolved.

The dyestuff solution obtained is poured into a mixture of 1800 parts by volume of water, 150 parts of sodium chloride and 80 parts by volume of 64% zinc chloride solution. The precipitated dyestuff of the formula

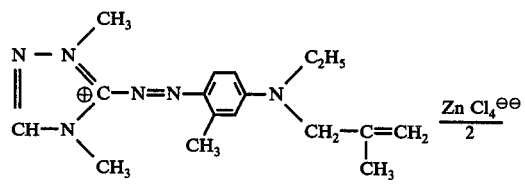

is isolated and optionally purified by reprecipitation. 100 Parts of dyestuff are obtained which dissolves in dilute acetic or formic acid giving a red color, and which dyes polyacrylonitrile fibers in red shades being fast to light and to wet treatment.

EXAMPLE 6

32.65 Parts of 4-chloro-3-nitrophenyl-trimethylammoniummethosulfate are introduced within 20 minutes, at 90° – 95° C, into a mixture of 125 parts by volume of water, 20 parts of iron powder and 0.5 part of glacial acetic acid which is refluxed for 30 minutes in order to partially corrode the iron. Subsequently, stirring is continued for 1 hour at 95° C, 5.3 parts of calcined sodium carbonate are added and the mixture is filtered at 90° C. 90 Parts by volume of 5N hydrochloric acid are added to the filtrate which is then cooled to 0° C. 20 Parts by volume of 5N sodium nitrite solution are added within 15 minutes, stirring is continued for 30 minutes, the nitrite excess is destroyed with amidosulfonic acid, and the diazo solution so obtained is subsequently clarified with kieselguhr. The diazo solution is poured at 10° – 15° C into a solution of 18.15 parts of 2-chloro-N-[2-methylpropenyl-(3)]-aniline in 200 parts by volume of water. Stirring is continued for 1 hour, and the dyestuff is precipitated by adding 12 parts by volume of 64% zinc chloride solution, suctionfiltered, washed with 5% sodium chloride solution and dried at 60° C. 36 Parts of dyestuff of the formula

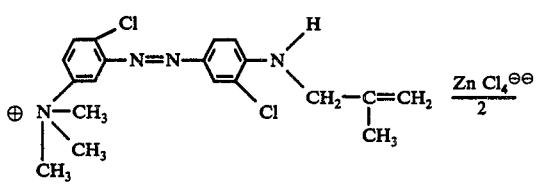

are obtained which is soluble in water and dilute acetic acid giving a golden yellow color.

1 Part of dyestuff is stirred with 2 parts of 50% acetic acid and dissolved in 500 parts by volume of water. 100 Parts of washed yarn made of polyacrylonitrile staple fiber are introduced at 60° C into the dyeing bath, the temperature is slowly raised to 100° C, and dyeing is carried out for 1 hour at boiling temperature. Subsequently, the whole is slowly cooled to about 70° C, the yarn is rinsed and dried. A clear reddish yellow dyeing is obtained having very good light and wet fastnesses.

The following Table indicates further dyestuffs of the invention as well as the shades of the dyeings on polyacrylonitrile fibers.

| Dyestuff | | Shade |
|---|---|---|
| [structure] | $ZnCl_4^{\ominus\ominus}/2$ | red |
| [structure] | $ZnCl_4^{\ominus\ominus}/2$ | red |
| [structure] | $CH_3SO_4^{\ominus}$ | red |
| [structure] | $CH_3SO_4^{\ominus}$ | claret |
| [structure] | $CH_3SO_4^{\ominus}$ | red |
| [structure] | $CH_3SO_4^{\ominus}$ | bordo |

-continued
| Dyestuff | | Shade |
|---|---|---|
| 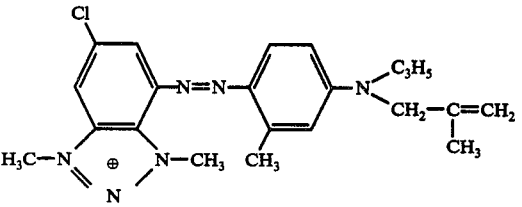 | CH₃SO₄⁻ | bordo |
| 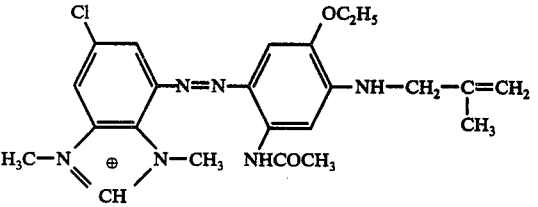 | Cl⁻ | bluish red |
| 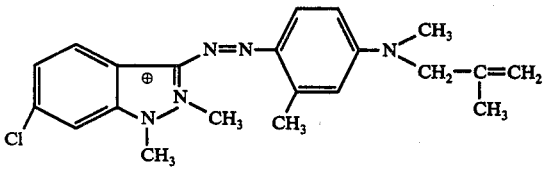 | CH₃SO₄⁻ | violet |
| 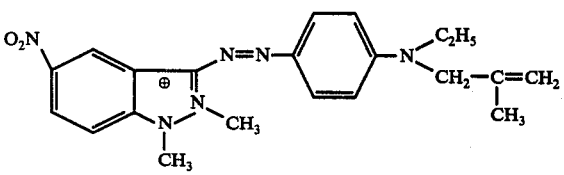 | CH₃SO₄⁻ | violet |
| 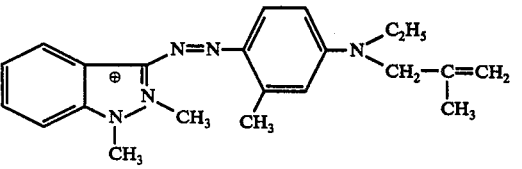 | $\frac{ZnCl_4^{2-}}{2}$ | bordo |
| 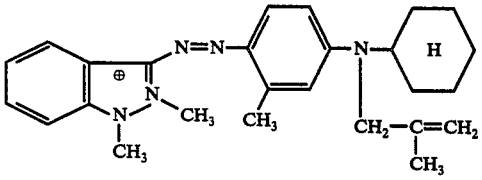 | $\frac{ZnCl_4^{2-}}{2}$ | bordo |
| 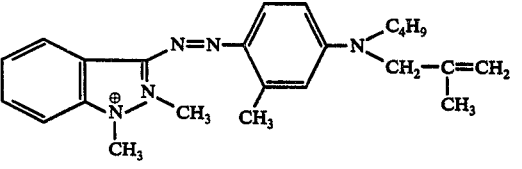 | $\frac{ZnCl_4^{2-}}{2}$ | bordo |
| 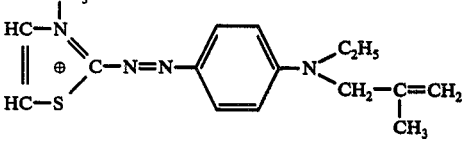 | $\frac{ZnCl_4^{2-}}{2}$ | reddish blue |

-continued
| Dyestuff | | Shade |
|---|---|---|
| 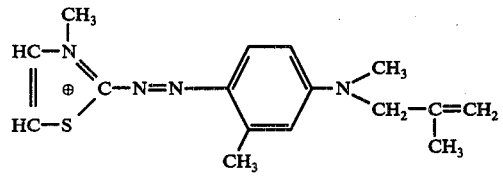 | $\dfrac{ZnCl_4^{\ominus\ominus}}{2}$ | reddish blue |
| 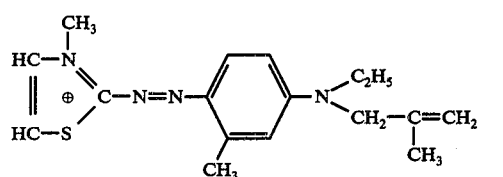 | $\dfrac{ZnCl_4^{\ominus\ominus}}{2}$ | reddish blue |
| 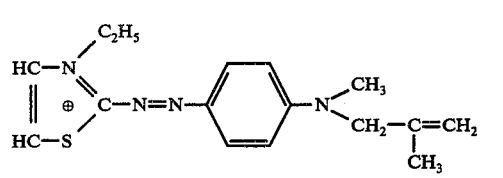 | $\dfrac{ZnCl_4^{\ominus\ominus}}{2}$ | reddish blue |
| 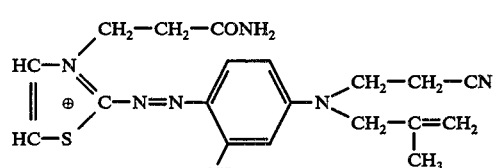 | $\dfrac{ZnCl_4^{\ominus\ominus}}{2}$ | reddish blue |
| 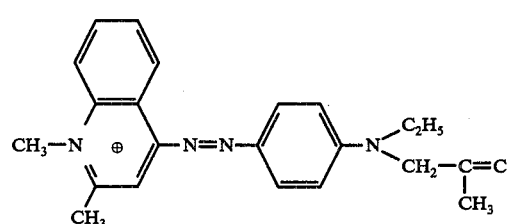 | $\dfrac{ZnCl_4^{\ominus\ominus}}{2}$ | blue |
| 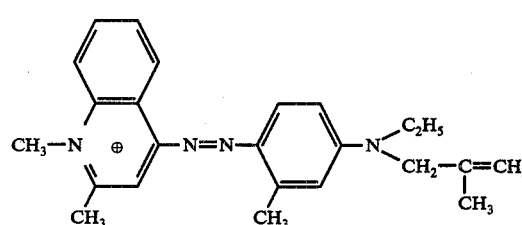 | $\dfrac{ZnCl_4^{\ominus\ominus}}{2}$ | blue |
| 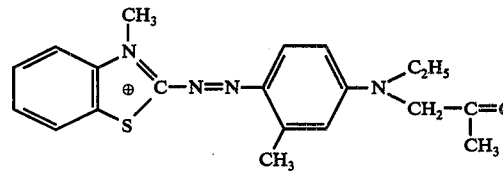 | $\dfrac{ZnCl_4^{\ominus\ominus}}{2}$ | blue |
| 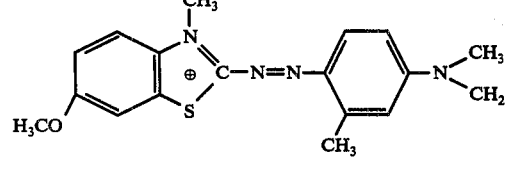 | $\dfrac{ZnCl_4^{\ominus\ominus}}{2}$ | blue |

-continued

| Dyestuff | | Shade |
|---|---|---|
| (benzothiazolium azo structure with N-CH3, 6-H3CO, phenyl-N(CH3)(CH2-C(CH3)=CH2)) | CH$_3$SO$_4^\ominus$ | blue |
| (benzothiazolium azo structure with N-CH3, 6-H3CO, phenyl-N(CH2CH2CN)(CH2-C(CH3)=CH2)) | CH$_3$SO$_4^\ominus$ | blue |
| (benzothiazolium azo structure with N-CH2-CH(OH)-CH2-Cl, 6-H5C2O, phenyl-N(benzyl)(CH2-C(CH3)=CH2)) | $\dfrac{ZnCl_4^{\ominus\ominus}}{2}$ | blue |
| (benzothiazolium azo structure with N-CH3, 6-H5C2O, phenyl-N(CH3)(CH2-C(CH3)=CH2)) | CH$_3$SO$_4^\ominus$ | blue |
| (benzothiazolium azo structure with N-CH3, 6-H5C2O, 2-methylphenyl-N(C2H5)(CH2-C(CH3)=CH2)) | $\dfrac{ZnCl_4^{\ominus\ominus}}{2}$ | blue |
| (benzothiazolium azo structure with N-CH3, 6-H3C, 2-methylphenyl-N(CH3)(CH2-C(CH3)=CH2)) | $\dfrac{ZnCl_4^{\ominus\ominus}}{2}$ | blue |
| (benzothiazolium azo structure with N-CH3, 6-H3C, phenyl-N(CH3)(CH2-C(CH3)=CH2)) | CH$_3$SO$_4^\ominus$ | blue |
| (benzothiazolium azo structure with N-CH3, 6,7-diCH3, 2-methylphenyl-N(CH3)(CH2-C(CH3)=CH2)) | $\dfrac{ZnCl_4^{\ominus\ominus}}{2}$ | blue |
| (benzothiazolium azo structure with N-CH3, 5,6-diCH3, phenyl-N(C2H5)(CH2-C(CH3)=CH2)) | CH$_3$SO$_4^\ominus$ | blue |
| (benzothiazolium azo structure with N-CH2-CH2-OH, 6-O2N, 2-methylphenyl-N(CH2CH2CONH2)(CH2-C(CH3)=CH2)) + | $\dfrac{ZnCl_4^{\ominus\ominus}}{2}$ | blue |

-continued

| Dyestuff | | Shade |
|---|---|---|
| 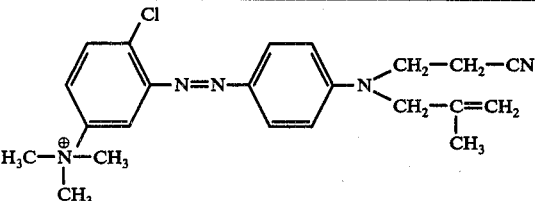 | $\frac{ZnCl_4^{\ominus\ominus}}{2}$ | golden yellow |
| 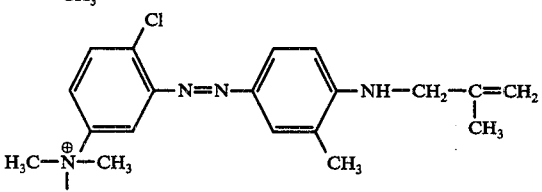 | $\frac{ZnCl_4^{\ominus\ominus}}{2}$ | golden yellow |
| 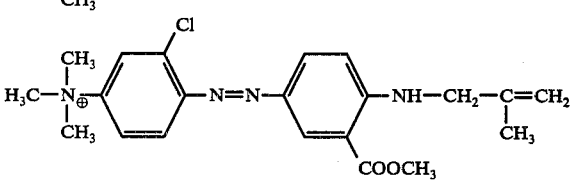 | $\frac{ZnCl_4^{\ominus\ominus}}{2}$ | golden yellow |
| 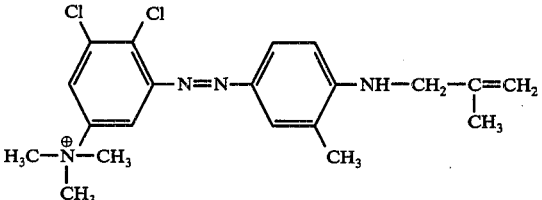 | $\frac{ZnCl_4^{\ominus\ominus}}{2}$ | golden yellow |
| 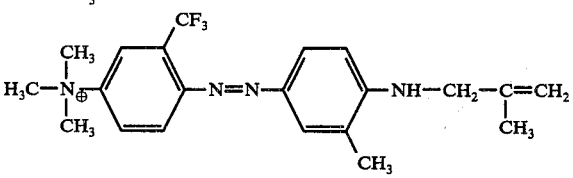 | $\frac{ZnCl_4^{\ominus\ominus}}{2}$ | golden yellow |
| 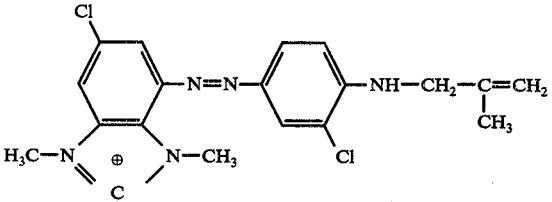 | $\frac{ZnCl_4^{\ominus\ominus}}{2}$ | yellowish orange |
| 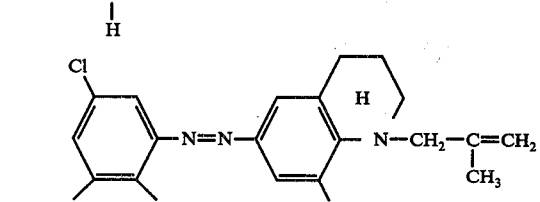 | $\frac{ZnCl_4^{\ominus\ominus}}{2}$ | red |
| 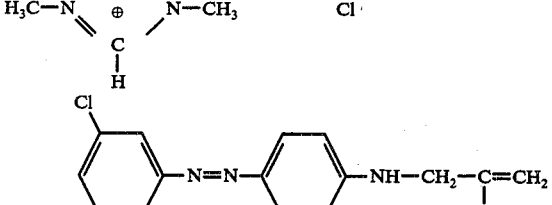 | $\frac{ZnCl_4^{\ominus\ominus}}{2}$ | yellowish orange |

-continued

| Dyestuff | | Shade |
|---|---|---|
| 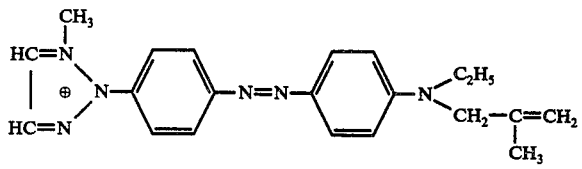 | $\frac{ZnCl_4^{\ominus\ominus}}{2}$ | golden yellow |
| 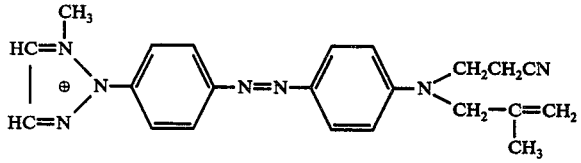 | $\frac{ZnCl_4^{\ominus\ominus}}{2}$ | golden yellow |
| 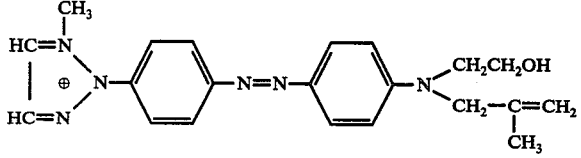 | $\frac{ZnCl_4^{\ominus\ominus}}{2}$ | golden yellow |
| 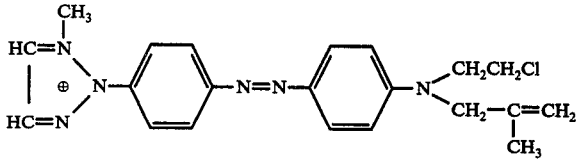 | $\frac{ZnCl_4^{\ominus\ominus}}{2}$ | golden yellow |
| 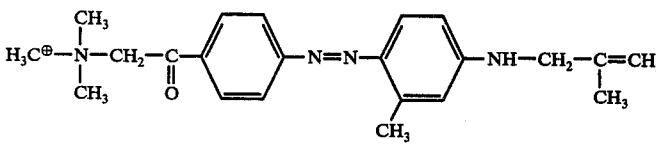 | $\frac{ZnCl_4^{\ominus\ominus}}{2}$ | orange |
| 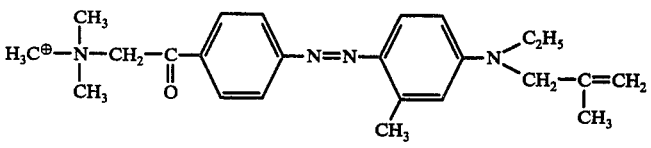 | $\frac{ZnCl_4^{\ominus\ominus}}{2}$ | reddish orange |
| 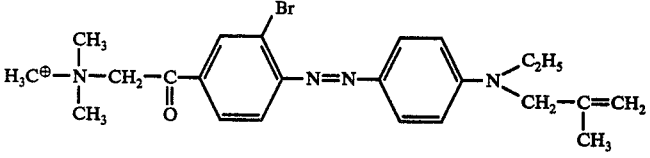 | $\frac{ZnCl_4^{\ominus\ominus}}{2}$ | orange |
| 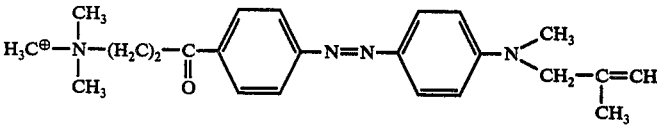 | $\frac{ZnCl_4^{\ominus\ominus}}{2}$ | orange |
| 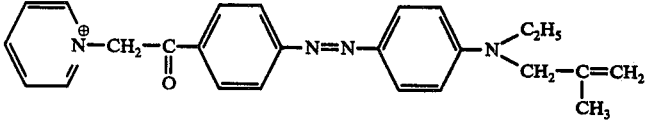 | $\frac{ZnCl_4^{\ominus\ominus}}{2}$ | orange |
| 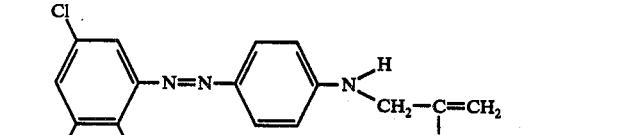 | $Cl^{\ominus}$ | orange |

-continued

| Dyestuff | | Shade |
|---|---|---|
| 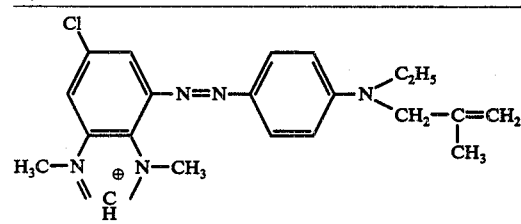 | $\dfrac{ZnCl_4^{\ominus\ominus}}{2}$ | reddish orange |
| 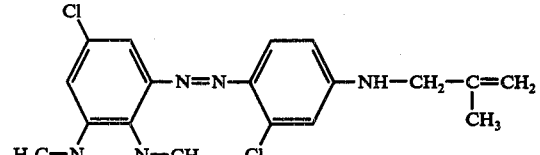 | $Cl^\ominus$ | orange |
| 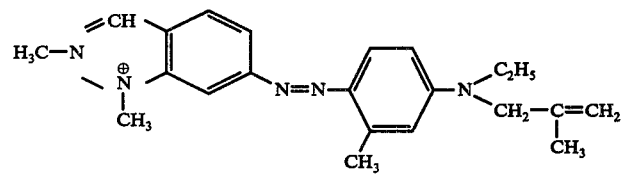 | $\dfrac{ZnCl_4^{\ominus\ominus}}{2}$ | orange |
| 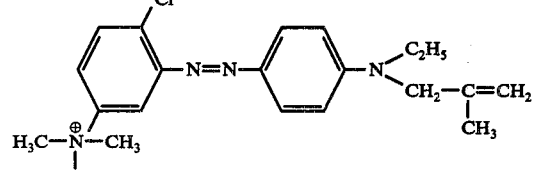 | $\dfrac{ZnCl_4^{\ominus\ominus}}{2}$ | orange |
| 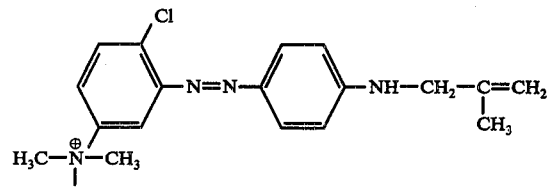 | $\dfrac{ZnCl_4^{\ominus\ominus}}{2}$ | orange |
| 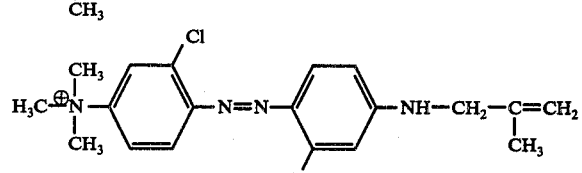 | $\dfrac{ZnCl_4^{\ominus\ominus}}{2}$ | orange |
| 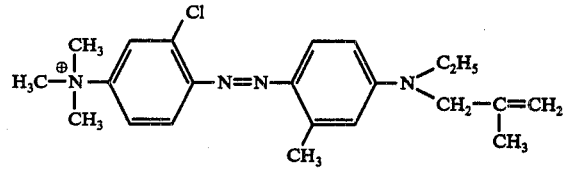 | $\dfrac{ZnCl_4^{\ominus\ominus}}{2}$ | orange |
| 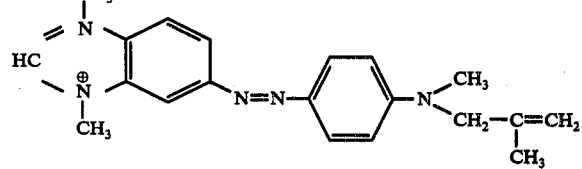 | $\dfrac{ZnCl_4^{\ominus\ominus}}{2}$ | orange |
| 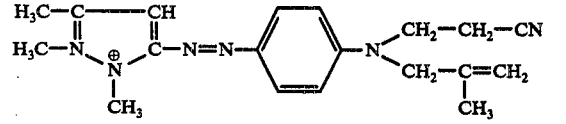 | $\dfrac{ZnCl_4^{\ominus\ominus}}{2}$ | orange |

| Dyestuff | | Shade |
|---|---|---|
| (structure) | $\dfrac{ZnCl_4^{\ominus\ominus}}{2}$ | reddish orange |
| (structure) | $\dfrac{ZnCl_4^{\ominus\ominus}}{2}$ | reddish orange |
| (structure) | $\dfrac{ZnCl_4^{\ominus\ominus}}{2}$ | reddish orange |
| (structure) | $\dfrac{ZnCl_4^{\ominus\ominus}}{2}$ | reddish orange |
| (structure) | $\dfrac{ZnCl_4^{\ominus\ominus}}{2}$ | reddish orange |
| (structure) | $\dfrac{ZnCl_4^{2(-)}}{2}$ | reddish orange |
| (structure) | $\dfrac{ZnCl_4^{\ominus\ominus}}{2}$ | red |
| (structure) | $\dfrac{ZnCl_4^{\ominus\ominus}}{2}$ | red |

-continued
| Dyestuff | | Shade |
|---|---|---|
| 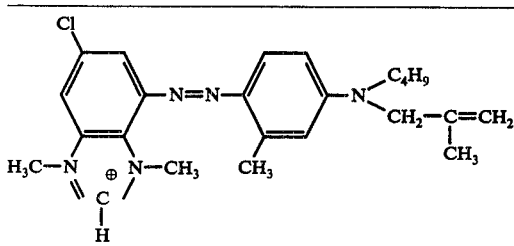 | Cl⊖ | red |
| 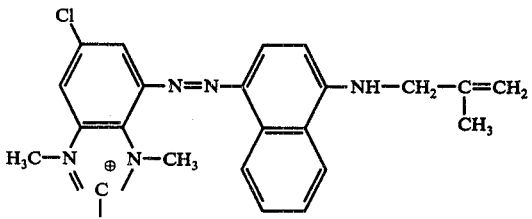 | $\dfrac{ZnCl_4^{\ominus\ominus}}{2}$ | red |
| 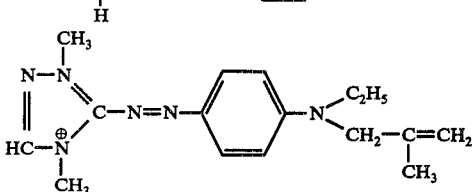 | $\dfrac{ZnCl_4^{\ominus\ominus}}{2}$ | red |
| 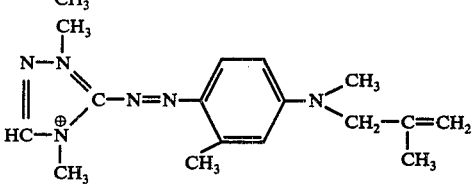 | $\dfrac{ZnCl_4^{\ominus\ominus}}{2}$ | red |
| 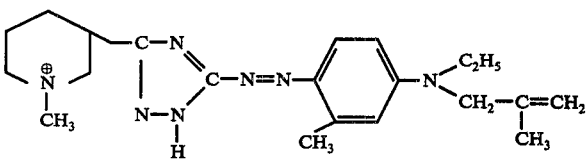 | $\dfrac{ZnCl_4^{\ominus\ominus}}{2}$ | red |
| 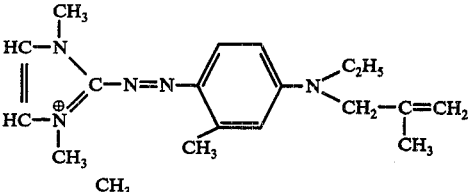 | $\dfrac{ZnCl_4^{\ominus\ominus}}{2}$ | red |
| 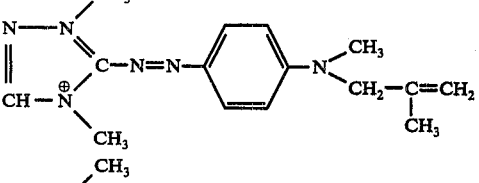 | $\dfrac{ZnCl_4^{\ominus\ominus}}{2}$ | red |
| 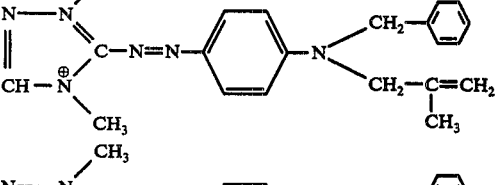 | $\dfrac{ZnCl_4^{\ominus\ominus}}{2}$ | red |
| 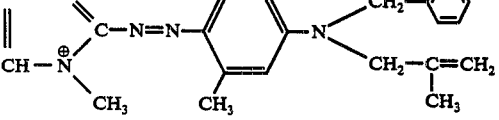 | $\dfrac{ZnCl_4^{\ominus\ominus}}{2}$ | red |

-continued

| Dyestuff | | Shade |
|---|---|---|
| 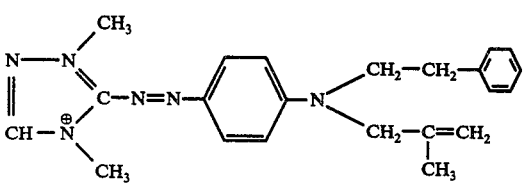 | $\dfrac{ZnCl_4^{\ominus\ominus}}{2}$ | red |
| 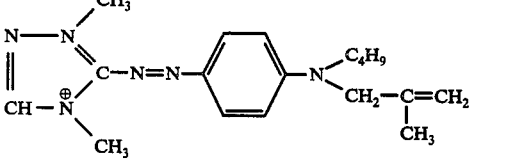 | $\dfrac{ZnCl_4^{\ominus\ominus}}{2}$ | red |
| 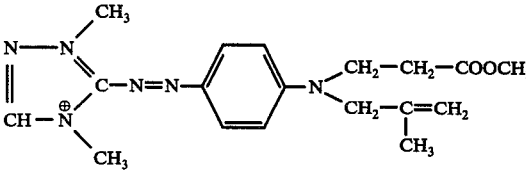 | $\dfrac{ZnCl_4^{\ominus\ominus}}{2}$ | red |
| 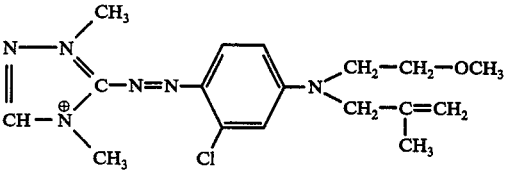 | $\dfrac{ZnCl_4^{\ominus\ominus}}{2}$ | red |
| 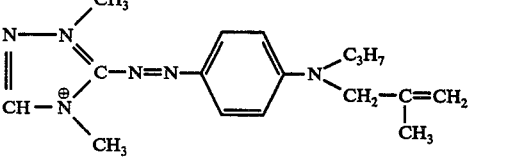 | $\dfrac{ZnCl_4^{\ominus\ominus}}{2}$ | red |
| 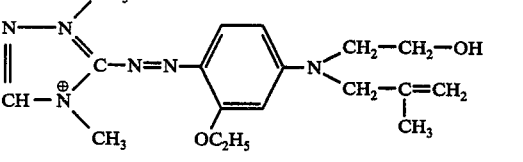 | $\dfrac{ZnCl_4^{\ominus\ominus}}{2}$ | red |
| 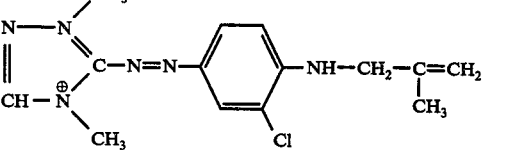 | $\dfrac{ZnCl_4^{\ominus\ominus}}{2}$ | yellowish orange |
| 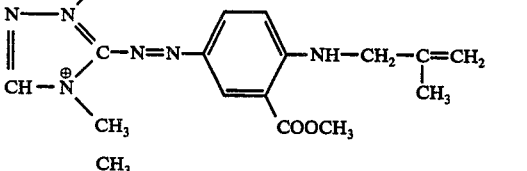 | $\dfrac{ZnCl_4^{\ominus\ominus}}{2}$ | yellowish orange |
| 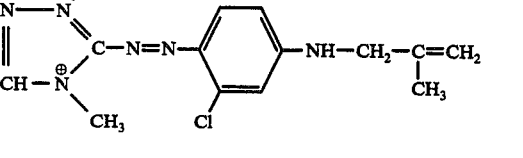 | $\dfrac{ZnCl_4^{\ominus\ominus}}{2}$ | orange |

4,082,740

-continued

| Dyestuff | | Shade |
|---|---|---|
| 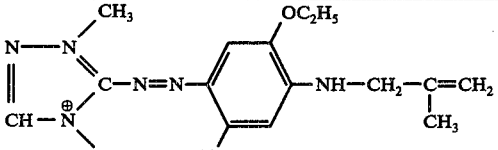 | $ZnCl_4^{\ominus\ominus}/2$ | bluish red |
| 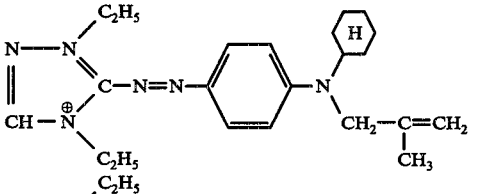 | $ZnCl_4^{\ominus\ominus}/2$ | red |
| 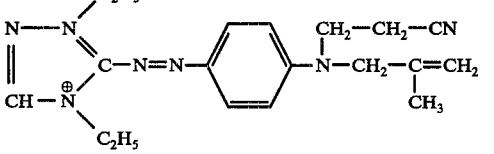 | $Cl^{\ominus}$ | red |
| 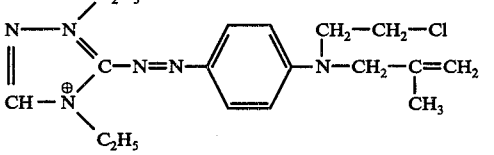 | $CH_3SO_4^{\ominus}$ | red |

EXAMPLE 7

45.4 Parts of 5-chloro-7-amino-1-methylbenzimidazole are stirred with 7.5 parts of magnesium oxide in 125 parts by volume of water, and 38.8 parts by volume of dimethyl sulfate are added within about 1 hour while stirring. Stirring is continued for about 2 hours at 50° – 60° C (pH 7.5 – 8.5), 2.5 parts of kieselguhr and 2.5 parts of active charcoal are added, the mixture is suction-filtered and washed with 120 parts by volume of hot water. 120 Parts by volume of 30% hydrochloric acid are added to the filtrate, and the whole is then cooled to 0° C. After having added 75 parts of ice, the mixture is diazotized by adding rapidly 75 parts of 5N sodium nitrite solution. After destruction of a small nitrite excess with a small amount of amido-sulfonic acid, the yellow-brown, clear diazo solution is introduced into a mixture of 36.75 parts of N-methyl-N-propenyl-(3)-aniline and 1000 parts by volume of water. Stirring is continued for 2 hours, and the dyestuff is precipitated with 25 parts by volume of about 64% zinc chloride solution. The precipitated dyestuff is suction-filtered, washed with 5% sodium chloride solution and dried at 50° C. 70 Parts of dyestuff of the formula

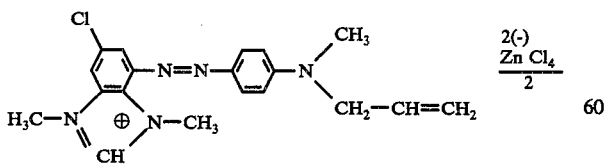

are obtained which is soluble in the substances indicated in Example 1, giving an orange color, and which dyes polyacrylonitrile fibers from a weakly acidic bath in orange shades being fast to light and to wet processing.

The dyestuff may also be obtained by coupling diazotized 1-methyl-5-chloro-7-amino-benzimidazole with N-methyl-N-propenyl-(3)-aniline and subsequently quaternizing the axo dyestuff so obtained.

EXAMPLE 8

18.7 Parts of N-methyl-benzothiazolone-2-hydrazone and 35 parts of 3-methyl-N-ethyl-N-propenyl-(3)-aniline are introduced into 1200 parts by volume of water and 320 parts by volume of 5N hydrochloric acid. At 40° C, a solution of 80 parts of anhydrous iron-III chloride in 400 parts by volume of water is added dropwise, and stirring is contined at 40° C until the reaction is complete (about 6 hours). The precipitated dyestuff is suction-filtered. Subsequently, the wet dyestuff is diluted with 4000 parts by volume of hot water, the solution obtained is clarified with addition of active charcoal and kieselguhr. 200 Parts of sodium chloride and 40 parts by volume of an about 64% zinc chloride solution are added to the filtrate. The dyestuff precipitating in the form of crystals is suction-filtered, washed with a 5% sodium chloride solution and dried at 60° C. 25 Parts of dyestuff of the formula

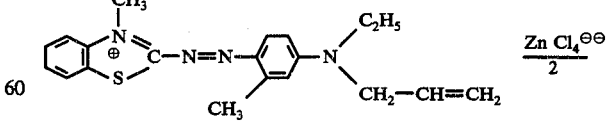

are obtained which is soluble in the substance indicated in Example 1, giving a blue color, and which dyes polyacrylonitrile fibers in blue shades being fast to light and to wet processing.

The coupling component used is obtained by heating of equimolar amounts of 3-methyl-N-ethyl-aniline and 3-chloropropene-(1) for several hours with or without pressure, in the presence of an acid-binding agent, for example tertiary aliphatic or aromatic amines, magnesium oxide or carbonate, sodium carbonate or bicarbonate, cabium oxide or carbonate. Optionally, this reaction may be carried out also in water or other suitable solvents such as toluene, chlorobenzene, xylene, dimethyl formamide, dimethyl sulfoxide, glycol, glycol ethers or esters.

EXAMPLE 9

11 Parts of 2-amino-thiazole are dissolved in 30 parts by volume of 95% sulfuric acid. At 0° – 5° C, diazotization is carried out with 30 parts of 42.3% nitrosylsulfuric acid, and stirring is continued for 30 minutes with nitrite excess. The diazotization mixture is poured onto 250 parts by volume of icewater and clarified with active charcoal and kieselguhr. Subsequently, 14.7 parts of N-methyl-N-propenyl-(3)-aniline are added to the diazo solution, which immediately starts the coupling. Stirring is continued for 3 hours until the coupling reaction is complete, the reaction mixture is then diluted with 1000 parts by volume of water and adjusted to pH 6 – 7 by means of sodium hydroxide solution. The precipitated dyestuff of the formula

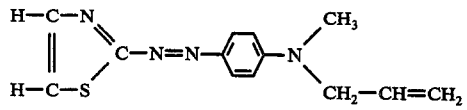

is isolated and dehydrated azeotropically with 500 parts by volume of chlorobenzene. The solution obtained is clarified with active charcoal and kieselguhr. A catalytic amount of magnesium oxide is added to the filtrate, subsequently, at 40° C, a solution of 15 parts by volume of dimethyl sulfate in 25 parts by volume of chlorobenzene is added dropwise within 30 minutes, stirring is continued for 1 hour at 40° – 50° C, the whole is heated slowly to 80° C, and stirring is continued at 80° – 90° C until the quaternization reaction is complete (about 6 – 8 hours). The reaction mixture is cooled to 25° C, the precipitated dyestuff is suction-filtered, washed with 200 parts by volume of chlorobenzene and dried at 50° C. 33 Parts of dyestuff of the formula

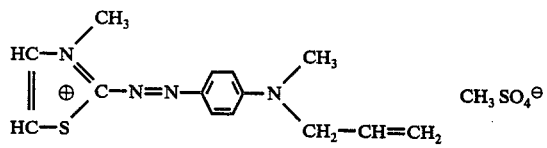

are obtained which may be further purified by redissolving in water and reprecipitation. The dyestuff is soluble in solvents as indicated in Example 1, giving a blue-violet color, and it dyes polyacrylonitrile fibers in reddish blue shades being fast to light and to wet processing. The dyestuff may be quaternized also in other organic solvents such as toluene, xylene, chloroform, acetonitrile, or in an aqueous medium.

When instead of dimethyl sulfate equimolar amounts of diethyl sulfate are used, the dyestuff of the formula

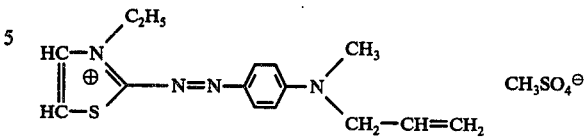

is obtained.

When instead of dimethyl sulfate epichlorohydrine is used and when the quaternization is carried out at about 50° C in glacial acetic acid, the dyestuff of the formula

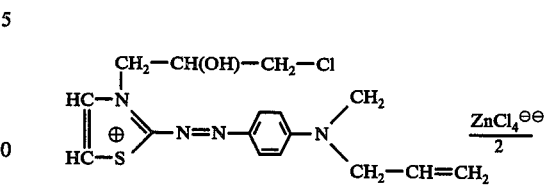

is obtained after precipitation with zinc chloride.

EXAMPLE 10

A solution containing 27 parts of 4-acetaminophenacyl-trimethylammonium chloride, 50 parts by volume of water and 100 parts by volume of 5N hydrochloric acid is refluxed for 60 minutes in order to saponify the acetyl group. The solution obtained is cooled to 0° C and diazotized at 0° – 5° C with 20 parts by volume of 5N sodium nitrite solution, stirring is continued for 30 minutes with nitrite excess which is then removed with amidosulfonic acid. The diazo solution is clarified with kieselguhr, and 16.1 parts of N-ethyl-N-propenyl-(3)-aniline are added with stirring which is continued for 1 hour, the solution is diluted with 150 parts by volume of water, 50 parts of sodium chloride are added and the dyestuff is precipitated in the form of zinc chloride salt by adding dropwise 20 parts by volume of 64% zinc chloride solution. After drying at 60° C, 20 parts of dyestuff of the formula

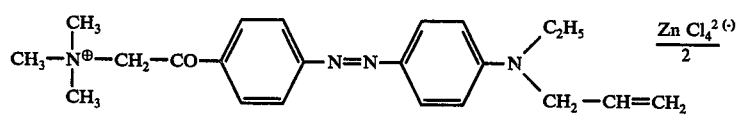

are obtained which, from a weakly acidic dyeing bath, dyes polyacrylonitrile fibers in orange shades having good light and wet fastness.

EXAMPLE 11

27.7 Parts of 3-amino-1,2,4-triazole are introduced into 36 parts by volume of water, and after 30 minutes, 48 parts by volume of 95% sulfuric acid are added in such a manner that the temperature does not exceed 30° C. After cooling to 0° C, diazotization is carried out at 0° – 5° C by means of 93.6 parts of 41% nitrosylsulfuric acid. While the nitrite excess is maintained, stirring is continued for 30 minutes. Subsequently; at 5° – 10° C, the diazotization mixture is added dropwise to a mixture of 48.3 parts of N-ethyl-N-propenyl-(3)-aniline in 200 parts by volume of water of 0° C, 100 parts by volume of 5N sulfuric acid and 3 parts of amidosulfonic acid. Stirring is continued for 1 hour, the mixture is then diluted with 500 parts by volume of water having a temperature of 0° C, and part of the mineral acid is neutralized by means of 110 parts by volume of 33% sodium hydroxide solution. Subsequently, the coupling mixture is poured into a solution of 2000 parts by volume of water and 200 parts of crystallized sodium acetate, and the whole is adjusted with sodium hydroxide solution to a pH of 5 to 6. Stirring is continued for several hours, and the dyestuff of the formula

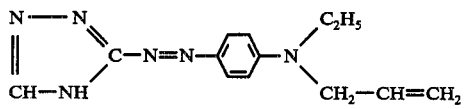

is suction-filtered.

For the quaternization, the wet dyestuff is stirred with 300 parts by volume of water and 15 parts of magnesium oxide. At 25° - 30° C, 80 parts by volume of dimethyl sulfate are added dropwise, the pH being maintained at 8 - 10. Stirring is continued for 3 hours at 30° C until the quaternization reaction is complete, which is advantageously observed by means of thin layer chromatography. The quaternization mixture is then adjusted to pH 3 by means of dilute hydrochloric acid, diluted with 2000 parts by volume of water and heated to 90° C until it is dissolved.

The dyestuff solution obtained is poured into a mixture of 1800 parts by volume of water, 150 parts of sodium chloride and 80 parts by volume of 64% zinc chloride solution. The precipitated dyestuff of the formula

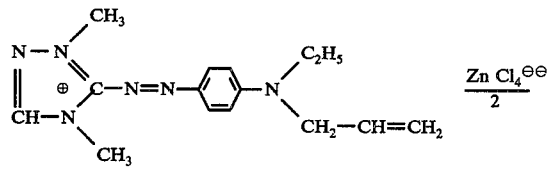

is isolated and optionally purified by reprecipitation. 100 Parts of dyestuff are obtained which dissolves in dilute acetic or formic acid giving a red color, and which dyes polyacrylonitrile fibers in red shades being fast to light and to wet treatment.

EXAMPLE 12

32.65 Parts of 4-chloro-3-nitrophenyl-trimethylammoniummethosulfate are introduced within 20 minutes, at 90° - 95° C, into a mixture of 125 parts by volume of water, 20 parts of iron powder and 0.5 part of glacial acetic acid which is refluxed for 30 minutes in order to partially corrode the iron. Subsequently, stirring is continued for 1 hour at 95° C, 5.3 parts of calcined sodium carbonate are added and the mixture is filtered at 90° C. 90 Parts by volume of 5N hydrochloric acid are added to the filtrate, which is then cooled to 0° C, 20 parts by volume of 5N sodium nitrite solution are added within 15 minutes, stirring is continued for 30 minutes, the nitrite excess is destroyed with amidosulfonic acid, and the diazo solution so obtained is subsequently clarified with kieselguhr. A solution of 17 parts of 2-chloro-N-propenyl-(3)-aniline in 100 parts by volume of glacial acetic acid is added to the diazo solution. Stirring is continued for 2 hours, and the solution is diluted with 600 parts by volume of water. Subsequently, the dyestuff is precipitated with 15 parts by volume of 64.7% zinc chloride solution, suction-filtered, washed with 5% sodium chloride solution and dried at 60° C. 28 Parts of dyestuff of the formula

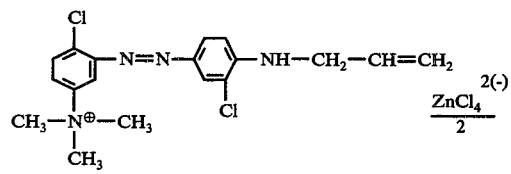

are obtained which is soluble in water and dilute acetic acid giving a golden yellow color.

1 Part of dyestuff is stirred with 2 parts of 50% acetic acid and dissolved in 5000 parts by volume of water. 100 Parts of washed yarn made of polyacrylonitrile staple fiber are introduced at 60° C into the dyeing bath, the temperature is slowly raised to 100° C, and dyeing is carried out for 1 hour at boiling temperature. Subsequently, the whole is slowly cooled to about 70° C, the yarn is rinsed and dried. A claer reddish yellow dyeing is obtained having very good light and wet fastnesses.

When acid-modified polyester fibers are used for dyeing, reddish yellow dyeings having good fastness properties are also obtained.

The following Table indicates further dyestuffs of the invention as well as the shades of the dyeings on polyacrylonitrile fibers.

| Dyestuff | | Shade |
|---|---|---|
| 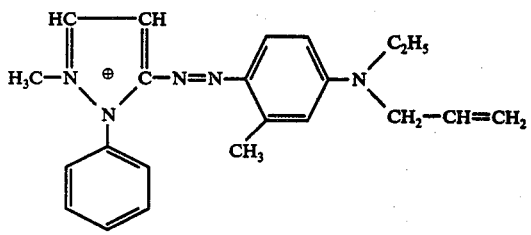 | CH₃SO₄⁻ | red |
| 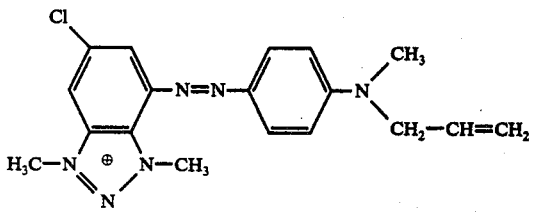 | CH₃SO₄⁻ | claret |
| 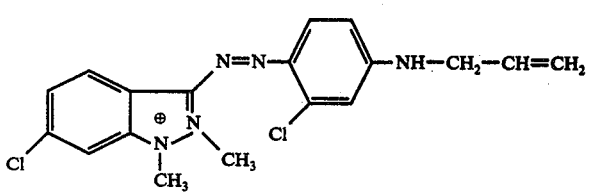 | CH₃SO₄⁻ | red |
| 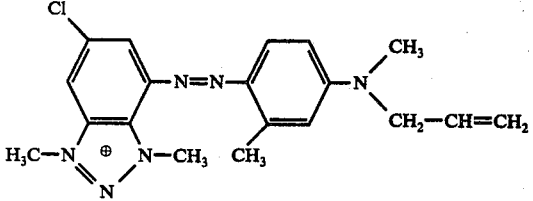 | CH₃SO₄⁻ | bordo |
| 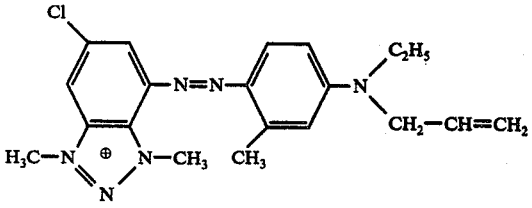 | CH₃SO₄⁻ | bordo |
| 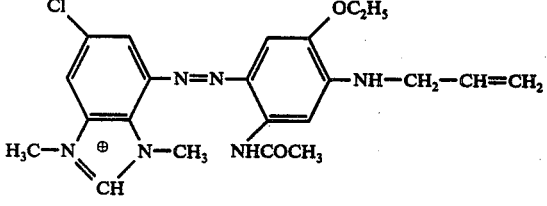 | Cl⁻ | bluish red |
| 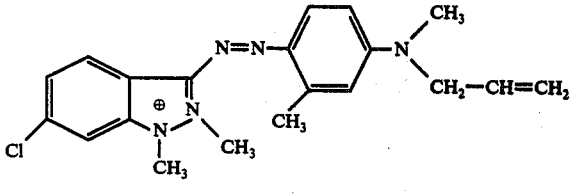 | CH₃SO₄⁻ | violet |

-continued
| Dyestuff | | Shade |
|---|---|---|
| 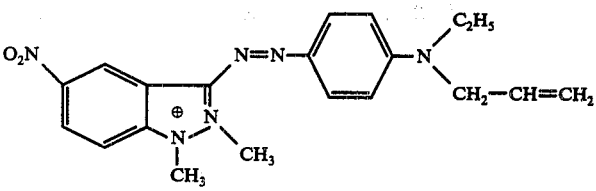 | $CH_3SO_4^{\ominus}$ | violet |
| 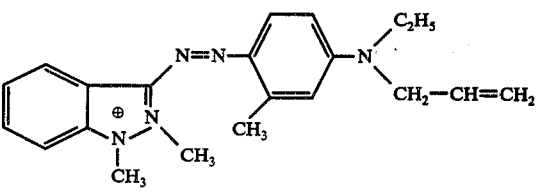 | $\dfrac{ZnCl_4^{\ominus\ominus}}{2}$ | bordo |
| 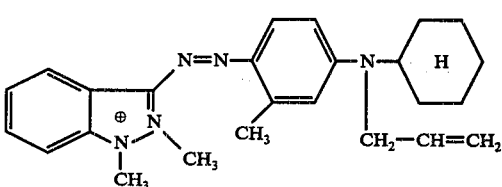 | $\dfrac{ZnCl_4^{\ominus\ominus}}{2}$ | bordo |
| 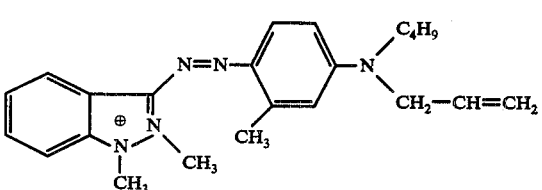 | $\dfrac{ZnCl_4^{\ominus\ominus}}{2}$ | bordo |
| 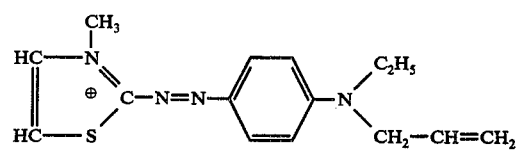 | $\dfrac{ZnCl_4^{\ominus\ominus}}{2}$ | reddish blue |
| 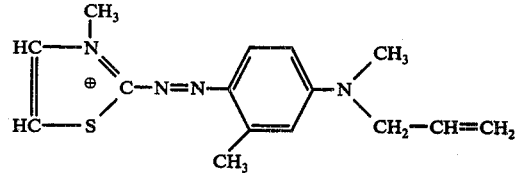 | $\dfrac{ZnCl_4^{\ominus\ominus}}{2}$ | reddish blue |
| 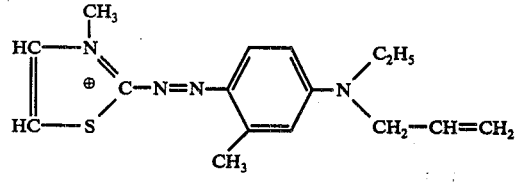 | $\dfrac{ZnCl_4^{\ominus\ominus}}{2}$ | reddish blue |
| 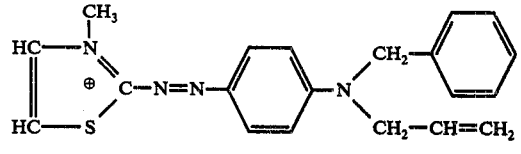 | $\dfrac{ZnCl_4^{2(-)}}{2}$ | reddish blue |

-continued

| Dyestuff | | Shade |
|---|---|---|
| (structure: 1-methyl-2-methylpyridinium-4-yl azo N-ethyl-N-allyl aniline) | $\frac{ZnCl_4^{\ominus\ominus}}{2}$ | blue |
| (structure: 1-methyl-2-methylpyridinium-4-yl azo 3-methyl-N-ethyl-N-allyl aniline) | $\frac{ZnCl_4^{\ominus\ominus}}{2}$ | blue |
| (structure: 3-methylbenzothiazolium-2-yl azo N-ethyl-N-allyl aniline) | $\frac{ZnCl_4^{\ominus\ominus}}{2}$ | blue |
| (structure: 6-methoxy-3-methylbenzothiazolium-2-yl azo 3-methyl-N-methyl-N-allyl aniline) | $\frac{ZnCl_4^{\ominus\ominus}}{2}$ | blue |
| (structure: 6-methoxy-3-methylbenzothiazolium-2-yl azo N-methyl-N-allyl aniline) | $CH_3SO_4^{\ominus}$ | blue |
| (structure: 6-ethoxy-3-methylbenzothiazolium-2-yl azo N-methyl-N-allyl aniline) | $CH_3SO_4^{\ominus}$ | blue |
| (structure: 6-ethoxy-3-methylbenzothiazolium-2-yl azo 3-methyl-N-ethyl-N-allyl aniline) | $\frac{ZnCl_4^{\ominus\ominus}}{2}$ | blue |
| (structure: 6-methyl-3-methylbenzothiazolium-2-yl azo 3-methyl-N-methyl-N-allyl aniline) | $\frac{ZnCl_4^{\ominus\ominus}}{2}$ | blue |
| (structure: 6-methyl-3-methylbenzothiazolium-2-yl azo N-methyl-N-allyl aniline) | $CH_3SO_4^{\ominus}$ | blue |

| Dyestuff | | Shade |
|---|---|---|
| 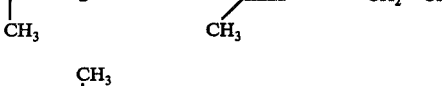 | $\dfrac{ZnCl_4^{\ominus\ominus}}{2}$ | blue |
| 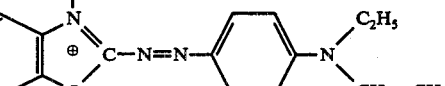 | $CH_3SO_4^{\ominus}$ | blue |
|  | $\dfrac{ZnCl_4^{\ominus\ominus}}{2}$ | reddish yellow |
| 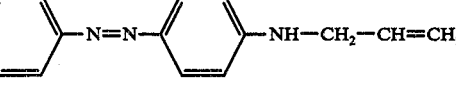 | $\dfrac{ZnCl_4^{\ominus\ominus}}{2}$ | golden yellow |
|  | $\dfrac{ZnCl_4^{\ominus\ominus}}{2}$ | golden yellow |
| 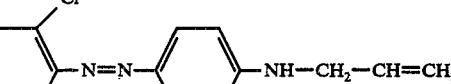 | $\dfrac{ZnCl_4^{\ominus\ominus}}{2}$ | golden yellow |
| 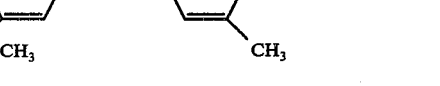 | $\dfrac{ZnCl_4^{\ominus\ominus}}{2}$ | golden yellow |
|  | $\dfrac{ZnCl_4^{\ominus\ominus}}{2}$ | golden yellow |

-continued

| Dyestuff | | Shade |
|---|---|---|
| 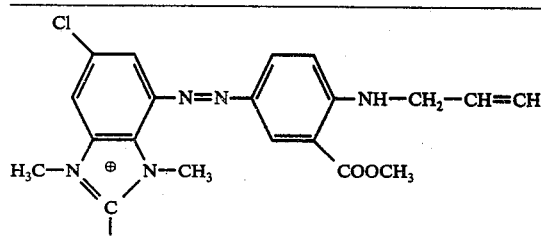 | $ZnCl_4^{\ominus\ominus}/2$ | golden yellow |
| 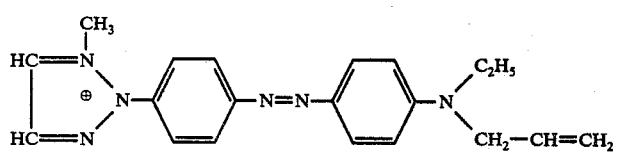 | $ZnCl_4^{\ominus\ominus}/2$ | golden yellow |
| 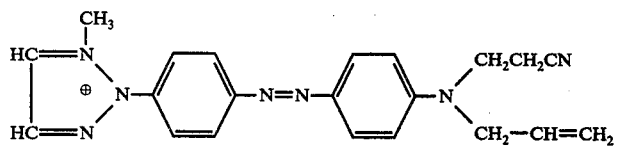 | $ZnCl_4^{\ominus\ominus}/2$ | golden yellow |
| 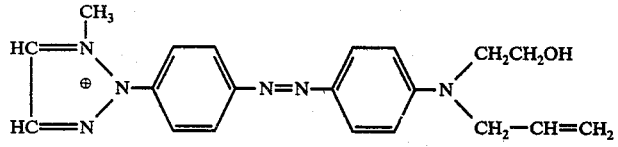 | $ZnCl_4^{\ominus\ominus}/2$ | golden yellow |
| 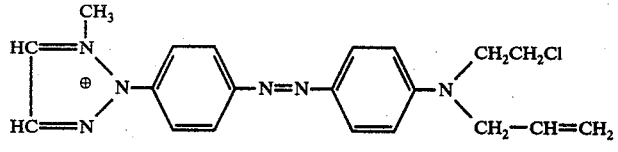 | $ZnCl_4^{\ominus\ominus}/2$ | golden yellow |
| 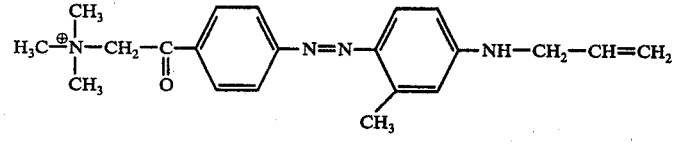 | $ZnCl_4^{\ominus\ominus}/2$ | orange |
| 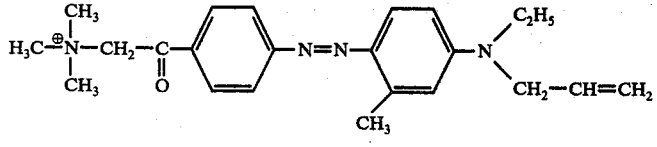 | $ZnCl_4^{\ominus\ominus}/2$ | red |
| 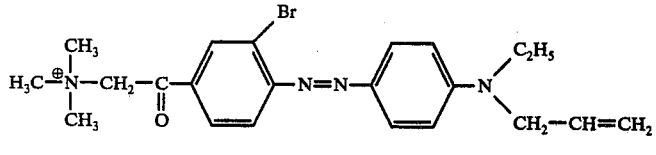 | $ZnCl_4^{\ominus\ominus}/2$ | reddish orange |
| 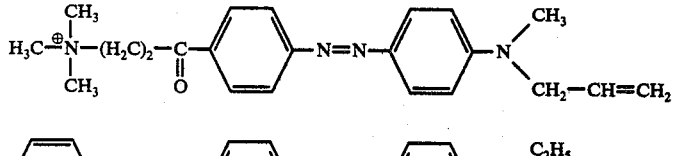 | $ZnCl_4^{\ominus\ominus}/2$ | reddish orange |
| 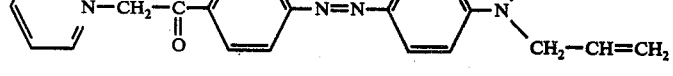 | $ZnCl_4^{\ominus\ominus}/2$ | reddish orange |

-continued
| Dyestuff | | Shade |
|---|---|---|
| 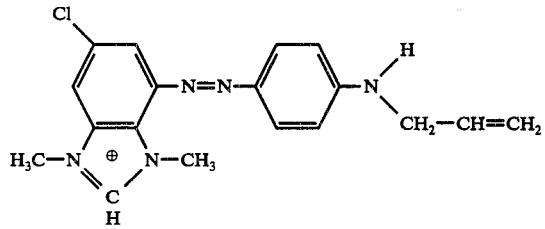 | Cl⁻ | orange |
| 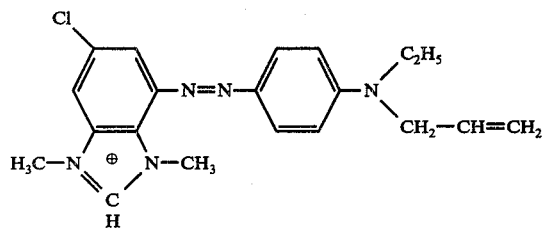 | $\dfrac{ZnCl_4^{2-}}{2}$ | orange |
| 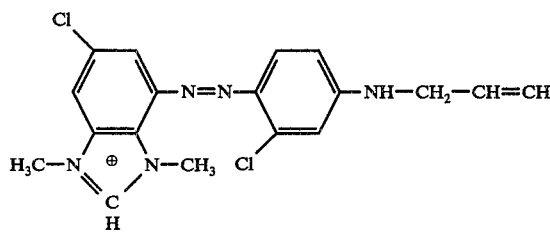 | Cl⁻ | orange |
| 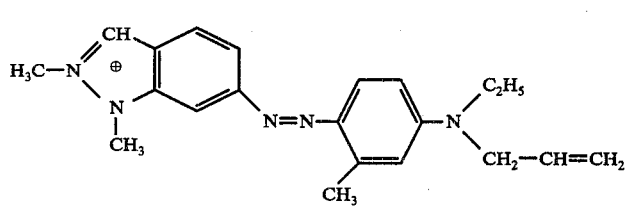 | $\dfrac{ZnCl_4^{2-}}{2}$ | orange |
| 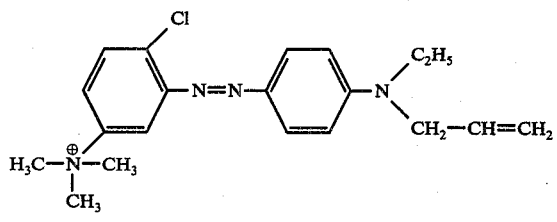 | $\dfrac{ZnCl_4^{2-}}{2}$ | orange |
| 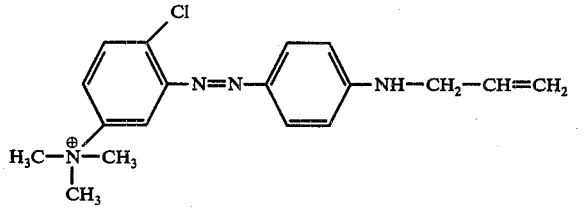 | $\dfrac{ZnCl_4^{2-}}{2}$ | orange |
| 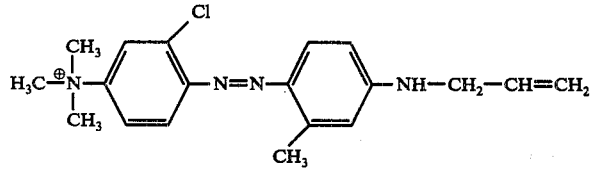 | $\dfrac{ZnCl_4^{2-}}{2}$ | orange |

| Dyestuff | | Shade |
|---|---|---|
| (structure: 3-chloro-4-[(4-(ethyl(allyl)amino)phenyl)azo]-N,N,N-trimethylanilinium) | $\dfrac{ZnCl_4^{\ominus\ominus}}{2}$ | orange |
| (structure: 1,3-dimethyl-5-[(4-(methyl(allyl)amino)phenyl)azo]benzimidazolium) | $\dfrac{ZnCl_4^{\ominus\ominus}}{2}$ | orange |
| (structure: 1,3-dimethyl-5-[(4-(allylamino)-2-methylphenyl)azo]benzimidazolium) | $\dfrac{ZnCl_4^{\ominus\ominus}}{2}$ | orange |
| (structure: triazolium dye with N-methyl, N-allyl aniline coupler) | $\dfrac{ZnCl_4^{\ominus\ominus}}{2}$ | orange |
| (structure: triazolium dye with N-(2-hydroxy-3-chloropropyl), N-allyl aniline coupler) | $\dfrac{ZnCl_4^{\ominus\ominus}}{2}$ | orange |
| (structure: triazolium dye with N-benzyl, N-allyl aniline coupler) | $\dfrac{ZnCl_4^{\ominus\ominus}}{2}$ | orange |
| (structure: triazolium dye with N-(2-acetoxyethyl), N-allyl aniline coupler) | $\dfrac{ZnCl_4^{\ominus\ominus}}{2}$ | orange |
| (structure: triazolium dye with N-butyl, N-allyl aniline coupler) | $\dfrac{ZnCl_4^{2(-)}}{2}$ | orange |

-continued
| Dyestuff | | Shade |
|---|---|---|
| 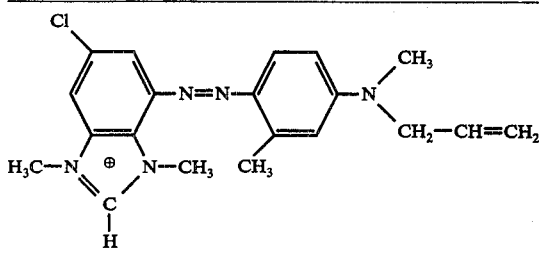 | $\dfrac{ZnCl_4^{\ominus\ominus}}{2}$ | yellowish red |
| 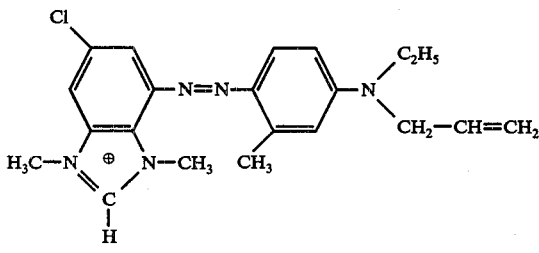 | $\dfrac{ZnCl_4^{\ominus\ominus}}{2}$ | red |
| 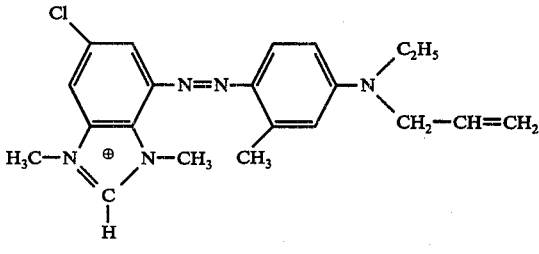 | $Cl^{\ominus}$ | red |
| 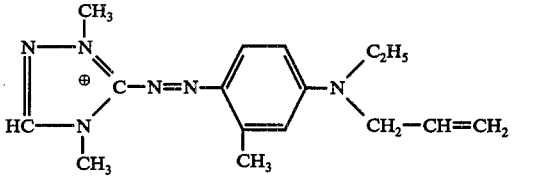 | $\dfrac{ZnCl_4^{\ominus\ominus}}{2}$ | red |
| 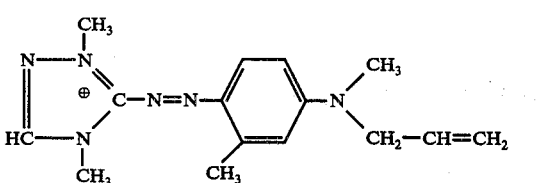 | $\dfrac{ZnCl_4^{\ominus\ominus}}{2}$ | red |
| 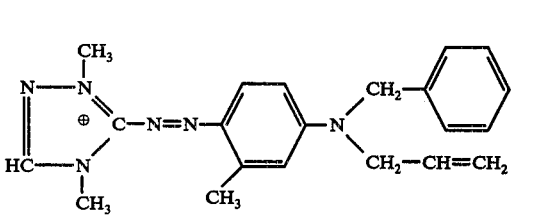 | $\dfrac{ZnCl_4^{\ominus\ominus}}{2}$ | red |
| 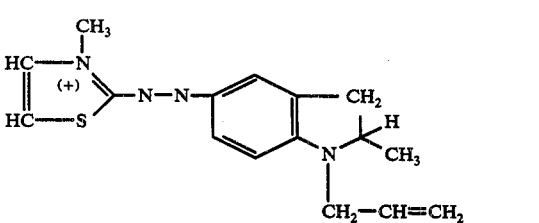 | $CH_3SO_4^{(-)}$ | red |

| Dyestuff | | Shade |
|---|---|---|
| (thiazolium-N(CH₃)-N=N-C₆H₄-N(C₆H₅)(CH₂-CH=CH₂)) | CH₃SO₄⁽⁻⁾ | reddish blue |
| (phenyl-pyrazolium with N(C₂H₅)(CH₂-CH=CH₂) aniline) | ZnCl₄⁼/2 | orange |
| (chloro-imidazolium aryl azo tetrahydroquinoline N-CH₂-CH₂-) | ZnCl₄⁼/2 | red |
| (benzisothiazole N=N-C₆H₃(CH₃)-N(CH₂CH₂CN)(CH₂CH=CH₂)) | ZnCl₄⁼/2 | blue |
| (1,2,4-triazolium(CH₃)₂ -N=N-C₆H₄-N(C₄H₉)(CH₂-CH=CH₂)) | ZnCl₄⁼/2 | red |
| (1,2,4-triazolium(CH₃)₂ -N=N-C₆H₄-N(CH₃)(CH₂-CH=CH₂)) | ZnCl₄⁼/2 | red |
| (1,2,4-triazolium(CH₃)₂ -N=N-C₆H₃(CH₃)-N(CH₂CH₂COOCH₃)(CH₂-CH=CH₂)) | ZnCl₄⁼/2 | red |
| (1,2,4-triazolium(CH₃)₂ -N=N-C₆H₃(CH₃)-N(CH₂CH₂OCH₃)(CH₂-CH=CH₂)) | ZnCl₄⁼/2 | red |

-continued
| Dyestuff | | Shade |
|---|---|---|
| 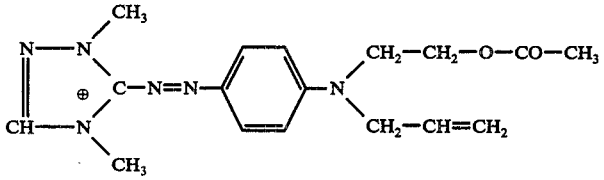 | ZnCl₄⊖⊖/2 | red |
| 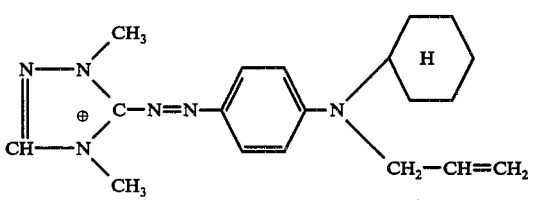 | ZnCl₄⊖⊖/2 | red |
| 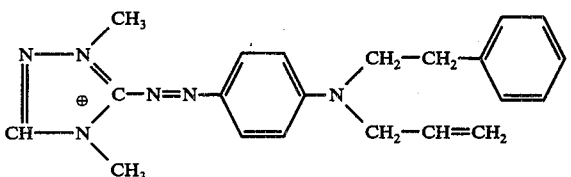 | ZnCl₄⊖⊖/2 | red |
| 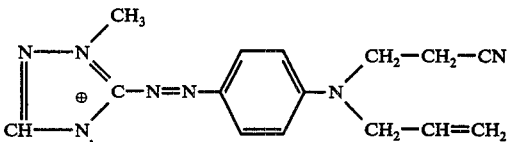 | ZnCl₄⊖⊖/2 | yellowish red |
| 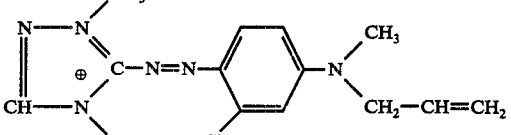 | ZnCl₄⊖⊖/2 | yellowish red |
| 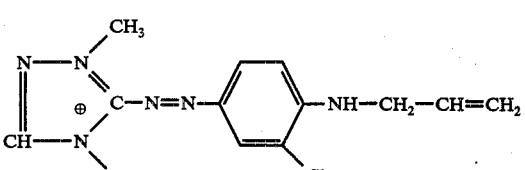 | ZnCl₄⊖⊖/2 | orange |
| 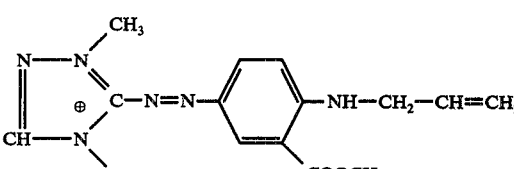 | ZnCl₄⊖⊖/2 | orange |
| 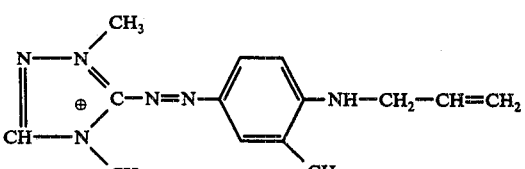 | ZnCl₄⊖⊖/2 | orange |

-continued

| Dyestuff | | Shade |
|---|---|---|
| 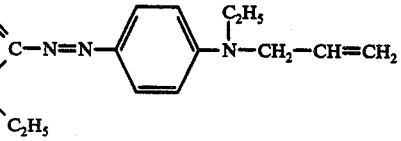 | $ZnCl_4^{\ominus\ominus}/2$ | red |
| 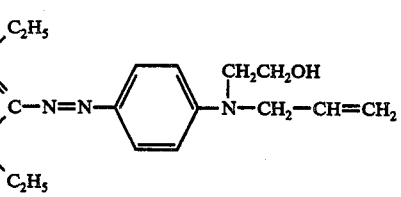 | $Cl^{\ominus}$ | red |
| 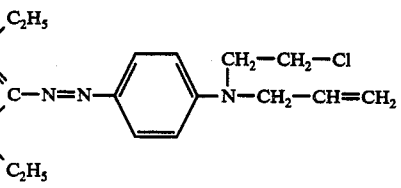 | $CH_3SO_4$ | red |
| 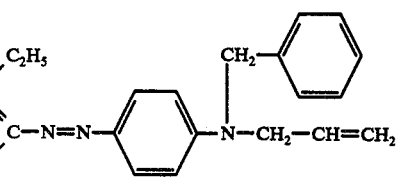 | $CH_3SO_4$ | red |

We claim:

1. A basic azo dyestuff which is free from sulfonic acid groups and has the formula

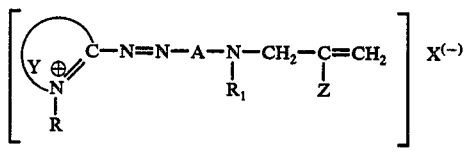

wherein
Y, together with

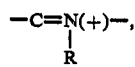

is thiazolyl, benzothiazolyl, pyrazolyl, indazolyl, triazolyl, guanazolyl, quinolinyl or pyridinyl,
A is phenylene or phenylene substituted by chlorine, methyl, ethyl, methoxy, ethoxy, carboxylic acid alkyl ester having from 2 to 5 carbon atoms, or acetylamino;
R and $R_1$ are identical or different and each represent hydrogen, alkyl having from 1 to 4 carbon atoms, beta-cyanoethyl, beta-hydroxyethyl, beta-chloroethyl, beta-chloro-γ-hydroxypropyl, beta-acetoxyethyl or benzyl,
Z is hydrogen or methyl, and
$X^{(-)}$ is an anion.

2. A basic azo dyestuff which is free from sulfonic acid groups and has the formula

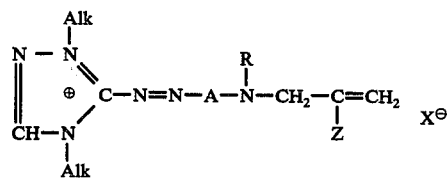

where
Alk is methyl or ethyl,
A is p-phenylene or p-phenylene substituted by chlorine, methyl, methoxy, acetylamino or carbomethoxy,
R is hydrogen of lower alkyl of 1 to 4 carbon atoms, β-cyanoethyl, β-chloroethyl, β-hydroxyethyl, β-methoxyethyl, β-carbomethoxyethyl, β-acetoxyethyl, cyclohexyl, benzyl or phenethyl,
Z is hydrogen or methyl and
X is an anion.

3. The dyestuff as claimed in claim 2 of the formula

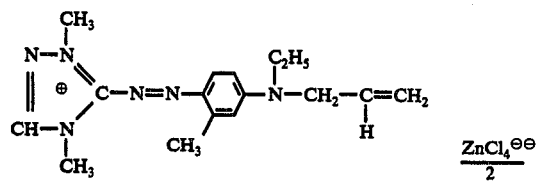

4. The dyestuff as claimed in claim 2 of the formula

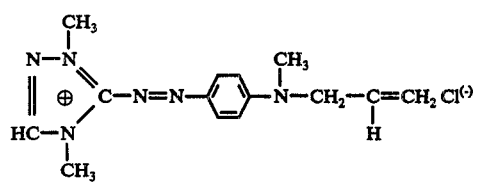
5. The dyestuff as claimed in claim 2 of the formula
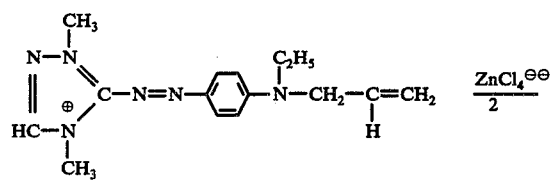
6. The dyestuff as claimed in claim 2 of the formula
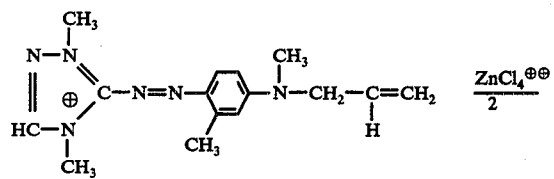
7. The dyestuff as claimed in claim 2 of the formula
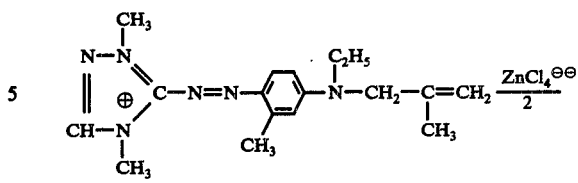
8. The dyestuff as claimed in claim 2 of the formula
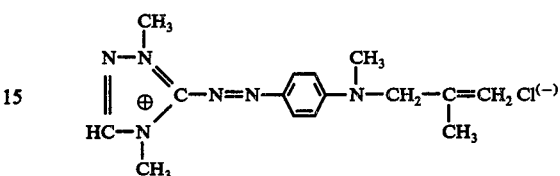
9. The dyestuff as claimed in claim 2 of the formula
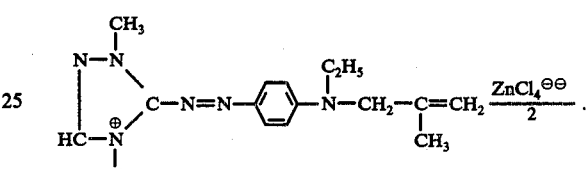
10. The dyestuff as claimed in claim 2 of the formula
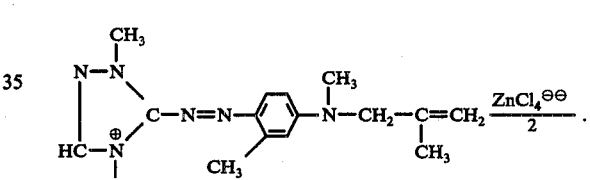
* * * * *